US00RE48336E

(19) United States
(12) Reissued Patent
Ueda et al.

(10) Patent Number: US RE48,336 E
(45) Date of Reissued Patent: Dec. 1, 2020

(54) ROLLING APPARATUS

(71) Applicant: NSK LTD., Tokyo (JP)

(72) Inventors: Koji Ueda, Fujisawa (JP); Toru Ueda, Fujisawa (JP); Naoya Seno, Fujisawa (JP); Nobuaki Mitamura, Fujisawa (JP)

(73) Assignee: NSK LTD., Tokyo (JP)

(21) Appl. No.: 16/398,979

(22) Filed: Apr. 30, 2019

Related U.S. Patent Documents

Reissue of:
(64) Patent No.: 8,088,230
Issued: Jan. 3, 2012
Appl. No.: 12/293,189
PCT Filed: May 16, 2007
PCT No.: PCT/JP2007/060073
§ 371 (c)(1),
(2) Date: Sep. 16, 2008
PCT Pub. No.: WO2007/135929
PCT Pub. Date: Nov. 29, 2007

(30) Foreign Application Priority Data

May 19, 2006 (JP) ..... 2006-140111
May 29, 2006 (JP) ..... 2006-148497
(Continued)

(51) Int. Cl.
*C22C 38/02* (2006.01)
*C21D 1/06* (2006.01)
(Continued)

(52) U.S. Cl.
CPC ..... *C22C 38/02* (2013.01); *C21D 1/06* (2013.01); *C21D 1/10* (2013.01); *C21D 9/40* (2013.01);
(Continued)

(58) Field of Classification Search
CPC ..... C22C 38/02; C22C 38/04; C22C 38/18; F16C 33/32; F16C 33/34; F16C 33/64;
(Continued)

(56) References Cited

U.S. PATENT DOCUMENTS 7,438,477 B2 * 10/2008 Ohki ..... C21D 1/78 384/492

FOREIGN PATENT DOCUMENTS

JP 61-270331 A 11/1986
JP 64-55423 A 3/1989
(Continued)

*Primary Examiner* — Jerry D Johnson
(74) *Attorney, Agent, or Firm* — Sughrue Mion, PLLC

(57) ABSTRACT

A rolling apparatus including an external member having a raceway surface on an inner peripheral surface thereof, an internal member having a raceway surface on an outer peripheral surface thereof, and a plurality of rolling elements which are rotatably provided between the raceway surface of the external member and the raceway surface of the internal member. A surface of at least one of the internal member, the external member, and the rolling elements is subjected to carbonitriding or nitriding; an area percentage of a nitride containing Si and Mn is 1% or more and 20% or less; surface hardness is HV750 or more. When depth from the raceway surface or depth from a rolling surface of the rolling element is defined as Z and diameter of the rolling element is defined as d, hardness at Z=0.045 d is HV650 to 850, and hardness at Z=0.18 d is HV400 to 800.

3 Claims, 14 Drawing Sheets

(30) Foreign Application Priority Data

| | | |
|---|---|---|
| May 30, 2006 | (JP) | 2006-150375 |
| Apr. 16, 2007 | (JP) | 2007-107250 |
| Apr. 23, 2007 | (JP) | 2007-112995 |

(51) Int. Cl.

| | |
|---|---|
| ***C21D 1/10*** | (2006.01) |
| ***C22C 38/04*** | (2006.01) |
| ***C22C 38/18*** | (2006.01) |
| ***F16C 33/64*** | (2006.01) |
| ***F16C 33/62*** | (2006.01) |
| ***C21D 9/40*** | (2006.01) |
| ***C23C 8/26*** | (2006.01) |
| ***C23C 8/32*** | (2006.01) |
| ***F16C 33/32*** | (2006.01) |
| ***F16C 33/34*** | (2006.01) |
| ***F16C 19/06*** | (2006.01) |
| ***F16C 19/36*** | (2006.01) |
| ***F16C 29/06*** | (2006.01) |

(52) U.S. Cl.

CPC ..... *C22C 38/04* (2013.01); *C22C 38/18* (2013.01); *C23C 8/26* (2013.01); *C23C 8/32* (2013.01); *F16C 33/32* (2013.01); *F16C 33/34* (2013.01); *F16C 33/62* (2013.01); *F16C 33/64* (2013.01); *C21D 2211/001* (2013.01); *C21D 2211/008* (2013.01); *F16C 19/06* (2013.01); *F16C 19/364* (2013.01); *F16C 29/0647* (2013.01); *Y02P 10/25* (2015.11); *Y10S 148/906* (2013.01)

(58) Field of Classification Search

CPC ..... F16C 33/62; F16C 19/06; F16C 29/0647; F16C 19/364; F16C 2202/04; C23C 8/32; C23C 8/26; C21D 1/10; C21D 1/06; C21D 2211/001; C21D 2211/008; C21D 9/40; Y02P 10/25; Y02P 10/253; Y10S 148/906

See application file for complete search history.

(56) References Cited

FOREIGN PATENT DOCUMENTS

| | | | |
|---|---|---|---|
| JP | 7-41934 | A | 2/1995 |
| JP | 8-311603 | A | 11/1996 |
| JP | 9-170624 | A | 6/1997 |
| JP | 09-257041 | A | 9/1997 |
| JP | 2003-193200 | A | 7/2003 |
| JP | 2004-52997 | A | 2/2004 |
| JP | 2005-282854 | A | 10/2005 |
| JP | 2005-337361 | A | 12/2005 |
| JP | 2006-105363 | A | 4/2006 |

* cited by examiner

ROLLING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a reissue application of U.S. Pat. No. 8,088,230, which was filed as U.S. application Ser. No. 12/293,189 on Sep. 16, 2008, issued on Jan. 3, 2012, which is a U.S. national stage application under 35 U.S.C. 371 of International Application No. PCT/JP2007/060073 filed on May 16, 2007 in the Japan Patent Office, and which claims priority to JP 2007-112995 filed Apr. 23, 2007, JP 2007-107250, filed Apr. 16, 2007, JP 2006-150375, filed May 30, 2006, JP 2006-148497, filed May 29, 2006, and JP 2006-140111, filed May 19, 2006, the disclosures of each of which are hereby incorporated by reference in their entirety.*

TECHNICAL FIELD

The present invention relates to a rolling apparatus, such as a rolling bearing, a ball screw, a linear guide, and the like.

BACKGROUND ART

In a rolling bearing, such as a ball bearing, a cylindrical roller bearing, a conical roller bearing, a self-aligning roller bearing, a needle bearing, and the like, used in an environment involving harsh lubrication conditions as in; for instance, an automobile, construction machinery, agricultural machinery, an iron and steel fixture, and the like, there is a high probability of: foreign substances being introduced into lubricating oil; indentation arising in a raceway surface as a result of biting of the foreign substances; and early exfoliation starting from the indentation.

A method proposed for solving the problem is to make an attempt to elongate flaking life by subjecting inner and outer rings and rolling elements to carburizing or carbonitriding, to thus precipitates a predetermined amount of retained austenite and relax the concentration of stress due to the indentation developed in the raceway surface (see Patent Document 1).

Another proposed method to make an attempt to extend the life is to enhance the hardness of a raceway surface by high-concentration carburizing, thereby enhancing the strength of a material (see Patent Document 2).

These methods are to strengthen individual components by taking the inner and outer rings and the rolling elements as individual components. Accordingly, when extension of life of the raceway ring is desired, an idea for subjecting a raceway ring to predetermined life-extending treatment is usually conceived.

Bearing steel typified by JIS SUJ2 or SUJ3 has hitherto been used for a rolling bearing, and the steel is usually used at hardness HRC 60 or more after having undergone quenching and tempering treatment.

However, in an environment where a foreign substance is contaminated to lubricant or insufficient lubrication is achieved as result of diversification of an environment where a rolling bearing is used, it may be the case where the bearing steel will fail to provide sufficient life or where seizure will arise. For these reasons, the steel is subjected to carbonitriding called marstressing, thereby making nitride into a solid solution and increasing the amount of retained austenite on the raceway surface. Thus, an attempt is made to relax the stress developed along an edge of the indentation in the foreign substances contaminated lubrication environment or enhance seizure resistance by an effect of nitrogen.

However, the environment where the rolling bearing is used has recently become harsh further, and there arises a case where a sufficient effect is not yielded by merely subjecting SUJ2 to carbonitriding. In order to solve the problem, a material provided with a large amount of added Si is used, and carbide or carbonitride containing Si and Mn is precipitated in an area percentage of 1 to 30%, thereby enhancing abrasion resistance and seizure resistance in an environment entailing occurrence of slide contact or an environment where lubricating oil becomes depleted. (see Patent Document 3).

Further, it has been well known that foreign substances, such as metal chips, shavings, burrs, dust resulting from abrasion, and the like, which are mixed in bearing lubricating oil inflict damage on a raceway ring or rolling elements of a rolling bearing, to thus significantly shorten the life of the rolling baring. Accordingly, the present inventor proposes that a content of C in the rolling surface layer of the bearing, the amount of retained austenite, and a content of carbonitride should be set to appropriate values even when the rolling bearing is used in the foreign substances contaminated lubrication environment, to thus relax the stress concentrated at an edge of indentation caused by the foreign substances, prevent occurrence of cracking, and extend the life of the rolling bearing (Patent Publication 1).

Patent Document 1: JP-A-64-55423
Patent Document 2: JP-A-7-41934
Patent Document 3: JP-A-2003-193200

DISCLOSURE OF THE INVENTION

Problem that the Invention is to Solve

As mentioned above, enhancement of durability has been variously considered in terms of a material or surface treatment. However, a market environment surrounding bearings has recently become severe in conjunction with miniaturization and speedup of machinery achieved in these days. The number of cases where a problem cannot be resolved by only the related-art life-extending technique is increasing.

Early exfoliation arising in a foreign substances contaminated lubrication environment, such as Patent Publication 4, is said to start from indentation formed as a result of biting of foreign substances between a rolling element and a raceway ring and to be attributable to concentration of stress induced by formation of the indentation. However, indentation-originated flaking is not caused by only concentration of stress but is also attributable to the influence of tangential force acting between the rolling elements and the raceway ring. Factors affecting tangential force include surface roughness and a surface geometry in addition to including sliding velocity and contact pressure. As the surface roughness becomes smaller and the surface geometry becomes superior, the tangential force acting between the rolling elements and the raceway ring becomes smaller, and the life of the bearing acquired in the foreign substances contaminated lubrication environment becomes longer.

However, an increase in the amount of retained austenite on a rolling surface results in a decrease in indentation resistance as well as a decrease in surface hardness and abrasion resistance. Therefore, when the amount of retained austenite on the rolling surface is large, indentation becomes more likely to be formed on the rolling surface by the influence of foreign substances or static excessive load. The rolling surface on which indentation is formed induces deformation or an increase in surface roughness. As the indentation becomes larger and the number of indentations increases, an increase in deformation and surface roughness becomes more noticeable. Specifically, in the foreign substances contaminated lubrication environment, as the amount of retained austenite on the rolling surface becomes greater, indentation becomes more likely to be formed, and therefore tangential force acting between the rolling elements and the raceway ring becomes greater.

When the amount of retained austenite on the rolling surface is large in the environment of foreign substances contaminated lubrication, even when the tangential force has become greater, the life of a member containing a large amount of austenite is not reduced because there is an effect of relaxing concentration of stress yielded by the influence of the retained austenite as described in Patent Document 1. However, since the tangential force of the same magnitude acts on two objects contacting each other, the life of a partner member is reduced. For instance, when the amount of retained austenite on the rolling surface of the raceway ring is increased, the life of the bearing is extended because of the effect of relaxing the concentration of stress. However, on the other hand, the life of rolling elements which are the partner member is reduced as a result of an increase in tangential force.

Even when the rolling elements are subjected to flaking or even when the raceway ring is subjected to flaking, the life of the bearing is affected, and hence the life of the rolling elements and the life of the raceway ring must be extended in order to extend the life of the entire bearing. Specifically, a sufficient life-extending effect is not yielded by only a technique of increasing the retained austenite on the rolling surface. Depending on conditions for use of the bearing, it may also be the case where the technique of extending the life of the bearing by increasing the amount of retained austenite cannot be adopted. For instance, when the bearing is used at high temperatures, the retained austenite deteriorates the dimensional stability of the bearing. For this reason, a small amount of austenite is desirable.

As described in Patent Document 3, under the method for forming a nitride containing Si and Mn, an appropriate composition of a material and an appropriate concentration of nitrogen are not specified, and there may be a case where sufficient performance cannot be exhibited.

The present invention has been conceived in view of the drawbacks, such as those mentioned above, and aims at providing a rolling bearing apparatus which enhances flaking resistance, abrasion resistance, and seizure resistance to a much greater extent while preventing an increase in cost and which can extend its life even in a foreign substances contaminated lubrication environment.

Means for Solving the Problem

Through assiduous studies, the present inventors have carried out investigations in order to find out material factors which sufficiently ensure indentation-originated flaking life of the material (e.g., rolling elements); which enhances indentation resistance and abrasion resistance of the material; and which also extends the life of a partner member (e.g., a raceway ring) by preventing deterioration of surface roughness and surface geometry and reducing tangential force acting between two objects (the rolling elements and the raceway ring). Consequently, the present inventors have found that surface hardness, residual austenite, the surface nitrogen concentration, and an area percentage of nitride which is precipitated on a surface and which contains Si and Mn (hereinafter described as a "Si.Mn-based nitride") are relevant material factors for enhancing indentation resistance and abrasion resistance, and has achieved the present invention.

Specifically, in order to achieve the object, the present invention provides the following rolling apparatus.

(1) A rolling apparatus including:

an external member having a raceway surface on an inner peripheral surface thereof;

an internal member having a raceway surface on an outer peripheral surface thereof; and a plurality of rolling elements which are rotatably provided between the raceway surface of the external member and the raceway surface of the internal member, wherein a surface of at least one of the internal member, the external member, and the rolling elements is subjected to carbonitriding or nitriding, an area percentage of a nitride containing Si and Mn is 1% or more and 20% or less, a hardness on a surface is HV750 or more, and when depth from the raceway surface or depth from a rolling surface of the rolling element is defined as Z and diameter of the rolling element is defined as d, hardness at Z=0.045 d is HV650 to 850, and hardness at Z=0.18 d is HV400 to 800.

(2) The rolling apparatus according to (1), wherein a concentration of nitrogen on a surface layer of at least one of the internal element, the external element, and the rolling elements is 0.2 mass % or more, and a number of nitride of which size is 0.05 μm to 1 μm and which contains Si and Mn in an area of 375 $\mu m^2$ is 100 or more.

(3) The rolling apparatus according to (2), wherein at least one of the carbonitrided or nitrided internal member, external member, and rolling elements is made of steel which contains 0.3 to 1.2 mass % of C,
0.3 to 2.2 mass % of Si,
0.3 to 2.0 mass % of Mn,
0.5 to 2.0 mass % of Cr,
5 or less of Si/Mn,
remaining Fe and
inevitable impurities.

(4) The rolling apparatus according to (3), wherein a carbonitrided or nitrided member is the rolling elements.

(5) The rolling apparatus according to (4), wherein, when a amount of retained austenite on the raceway surfaces is defined as $\gamma r_{AB}$ and when a amount of retained austenite on the rolling surface of the rolling element is defined as $\gamma r_C$, $\gamma r_{AB}-15 \leq \gamma r_C \leq \gamma r_{AB}+15$ ($0 \leq \gamma r_{AB}$, $\gamma r_C \leq 50$, and a unit is vol. %) is satisfied.

(6) The rolling apparatus according to (5), wherein, at least one of the internal member and the external member is made of steel which contains:

0.15 to 1.2 mass % of C,
0.1 to 1.5 mass % of Si,
0.2 to 1.5 mass % of Mn,
0.5 to 2.0 mass % of Cr,
remaining Fe and
inevitable impurities.

(7) The rolling apparatus according to (6), wherein at least one of the internal member and the external member is made of high-carbon chromium bearing steel.

(8) The rolling apparatus according to (7), wherein on the raceway surface of a raceway ring is made of high-carbon chromium bearing steel among the internal member and the external member, a surface layer section hardened by heat treatment including carburizing or carbonitriding is formed, hardness of the surface layer section is HRC58 or more and HRC66 or less, and hardness of an internal core of the surface layer section is HRC56 or more and HRC64 or less.

(9) The rolling apparatus according to (6), wherein a surface nitrogen concentration on the raceway surface of the internal member and the external member is 0.05 mass % or less.

(10) The rolling apparatus according to (9), wherein a Si content and a Mn content in the rolling elements is 1.0 mass % or more.

Advantage of the Invention

A rolling apparatus of the present invention enhances indentation resistance and abrasion resistance by defining the hardness of an internal member, the hardness of an external member, and the hardness of rolling elements which are achieved at a surface level and a specific depth and an area percentage of an Si.Mn-based nitride, thereby preventing an increase in tangential force between the rolling elements and the raceway ring during use of a bearing and enhancing flaking resistance strength.

Figure 1:
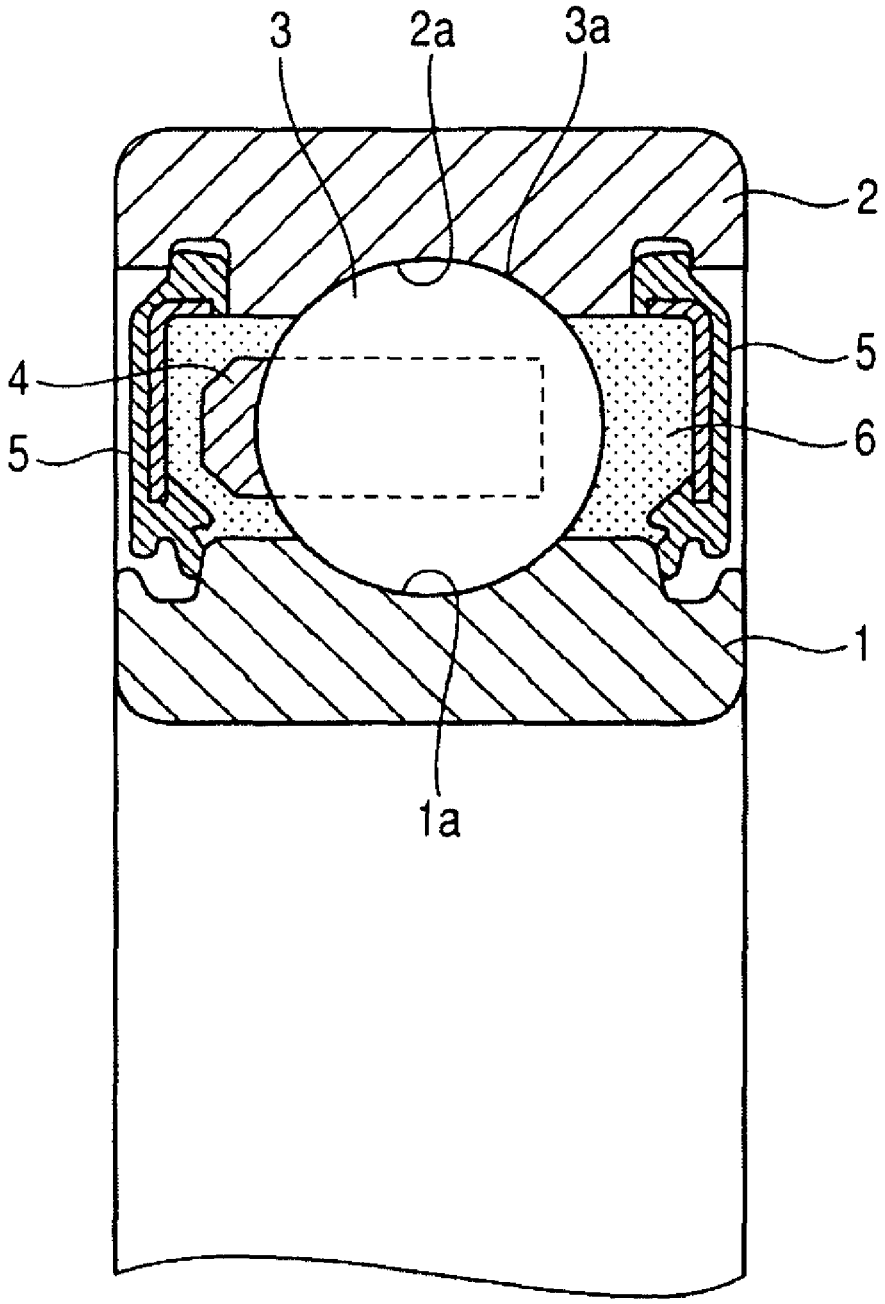
FIG. 1 is a cross-sectional view of a deep groove ball bearing which is an example of a rolling apparatus.

| Descriptions of Reference Numerals | |
|---|---|
| 1 | INNER RING |
| 1a | RACEWAY SURFACE |
| 2 | OUTER RING |
| 2a | RACEWAY SURFACE |
| 3 | ROLLING ELEMENT |
| 3a | ROLLING SURFACE |
| 4 | CAGE |
| 10 | LINEAR GUIDE |
| 11 | GUIDE RAIL |
| 12 | SLIDER |
| 13 | BALL |
| 22 | BALL SCREW |
| 23 | BALL SCREW NUT |
| 24 | BALL |
| 25 | CIRCULATOR TUBE |
| 26 | SPACER |

BEST MODES FOR IMPLEMENTING THE INVENTION

The present invention will be described in detail hereunder.

A rolling bearing can be mentioned as an example of the rolling apparatus of the present invention. No limitations are imposed on the type and structure of a rolling bearing, and a deep groove ball bearing shown in FIG. 1 can be exemplified. The deep groove ball bearing has an inner ring 1 (an internal member) having a raceway surface 1a on an outer peripheral surface thereof; an outer ring 2 (an external member) having a raceway surface 2a on an inner peripheral surface thereof opposing the raceway surface 1a of the inner ring 1; balls which are rotatably provided between the raceway surfaces 1a and 2a and which correspond to a plurality of rolling elements 3; a cage 4 for retaining the rolling elements 3 between the inner ring 1 and the outer ring 2; and seals 5 and 5 for covering an opening of clearance between the inner ring 1 and the outer ring 2. Lubrication between the raceway surfaces 1a and 2a and rolling surfaces 3a of the rolling elements 3 is embodied by lubricant 6 such as grease, lubricating oil, and the like. The cage 4 and the seal 5 may be omitted.

Figure 2:
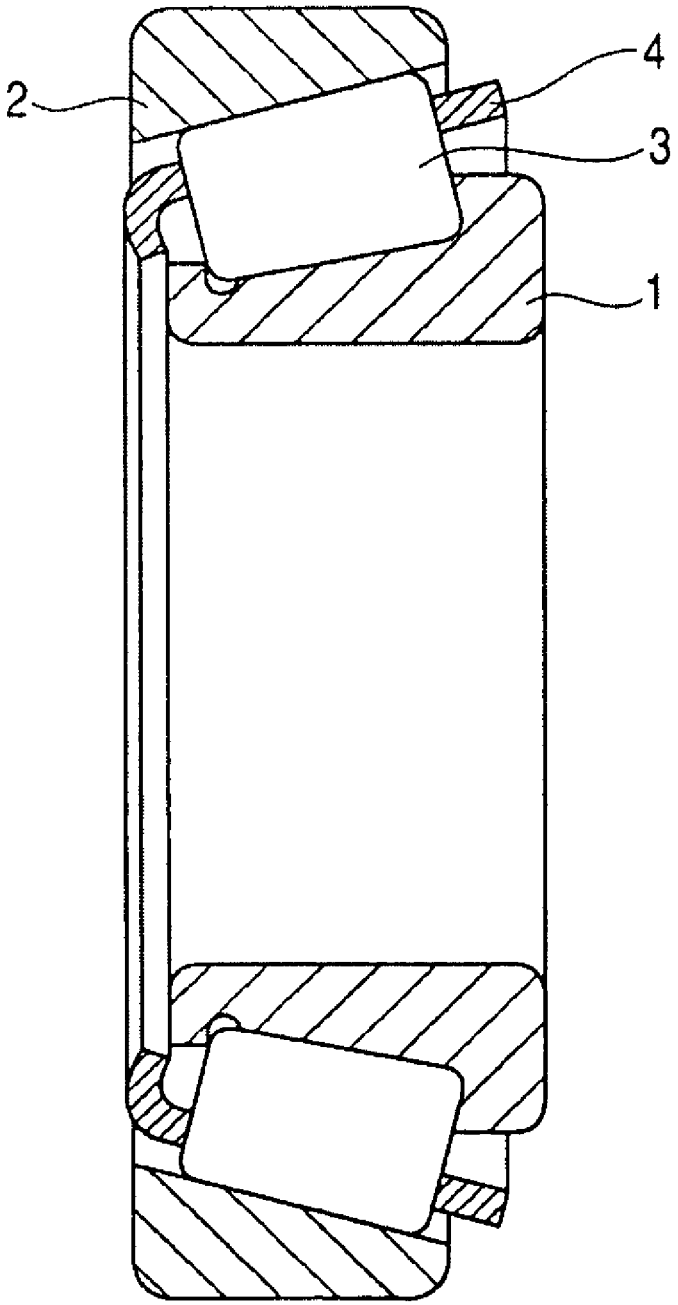
FIG. 2 is across-sectional view of a conical roller bearing which is another example of the rolling apparatus.

A conical roller bearing having bearing number L44649/610, such as that shown in FIG. 2, can be exemplified as the rolling bearing, wherein conical rollers serving as the rolling elements 3 are retained between the inner ring 1 and the outer ring 2 by the cage 4. Moreover, although omitted from the drawings, an angular ball bearing, a cylindrical roller bearing, a self-aligning roller bearing, a needle roller bearing and the like, are also available.

Figure 3:
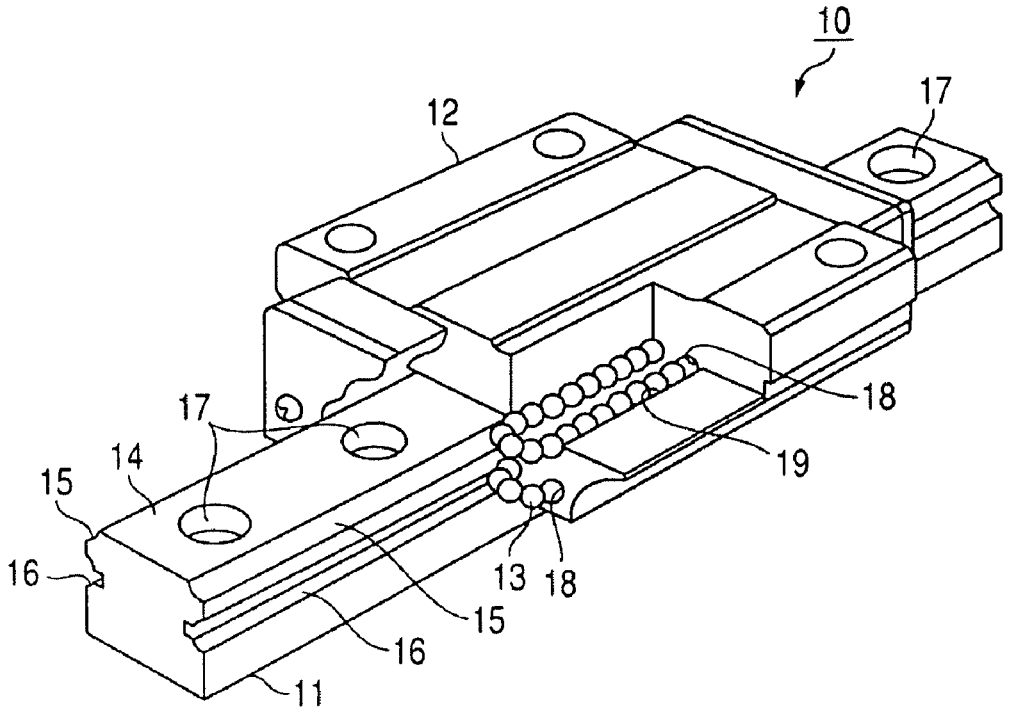
FIG. 3 is a perspective view of a linear guide which is still another example of the rolling apparatus.

A linear guide, such as that shown in FIG. 3, can be also exemplified as the rolling apparatus. The linear guide 10 has a guide rail 11 (an internal member), a slider 12 (an external member) which is provided on a guide rail 11 and which is attached to the guide rail 11 so as to be movable in an axial direction, and a plurality of balls 13 serving as rolling elements. A rail surface 14 is formed over an upper surface of the guide rail 11, and rail raceway surfaces 15, 16 for enabling slidable movement of the rolling elements 13 are formed in two rows; namely, one is an upper row and the other is a lower row, along either side surface of the guide rail 11. A bolt hole 17 vertically penetrating through the rail surface 14 is formed at a plurality of positions along the axial direction. As a result of bolts being screwed into the bolt holes 17, the guide rail 11 is secured to a machining bed. In a slider 12, slider raceway surfaces 19 for enabling slidable movement of the rolling elements 13 are formed in a rolling-element circulation channel 18 which retains the rolling elements 13 in a circulating manner.

Figure 4:
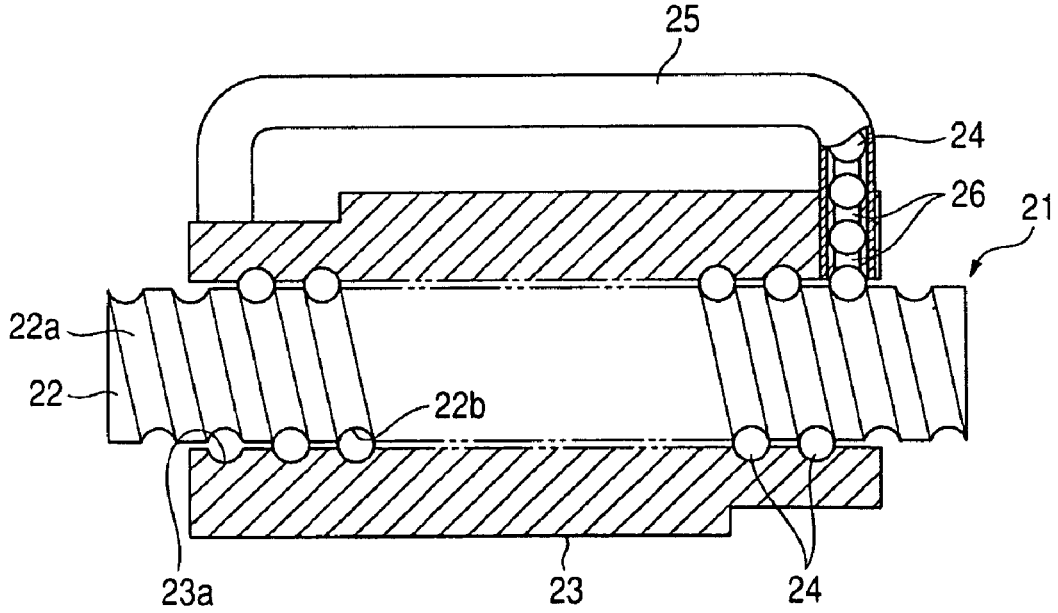
FIG. 4 is a cross-sectional view of a ball screw which is yet another example of the rolling apparatus.

A ball screw, such as that shown in FIG. 4, can also be exemplified as the rolling apparatus. A ball screw 21 has a screw shaft 22 (an internal member) having a helical thread groove 22a on an outer peripheral surface thereof; a ball screw nut 23 having a helical thread groove 23a on an inner peripheral surface thereof corresponding to the thread groove 22a of the screw shaft 22 and which is screw-engaged with the screw shaft 22 by way of a plurality of balls 24 serving as rolling elements which are fitted into a helical ball rolling space formed from the thread groove 22a of the screw shaft 22 and the thread groove 23a of the ball screw nut 23 (an external member) rotatably and which are spaced apart from each other with a spacer 26 sandwiched therebetween; and a circulator tube 25. The circulator tube 25 is for circulating the balls 24 rotatably in conjunction with the spacers 26 by rotation of either the screw shaft 22 or the ball screw nut 23, and is attached to the ball screw nut 23.

By such a configuration, the balls 24 moving rotatably, through the ball rolling space travel through the ball rolling space along with the spacers 26 and are guided upwardly at one end of the circulator tube 25 after turning around the screw shaft 22 a plurality of times; and pass through the circulator tube 25 and return to the ball rolling space from the other end of the circulator tube, thereby repeating a circulation. A cross-sectional profile of the thread grooves 22a and 23a can be selected appropriately, as required, and may also be realized as a Gothic arch; namely, an essentially-V-shaped form made by combination of two circular arcs whose curvature centers are different, or a circular-arc form.

The present invention is characterized in that the hardness of a material forming the internal members (the inner ring, the guide rail, and the screw shaft), the hardness of the external members (the outer ring, the slider, and the ball screw nut), and the hardness of the rolling elements (balls, conical rollers, and balls) of the rolling apparatus are specified.

In these rolling apparatuses, a material factor which is most effective for enhancing indentation resistance is hardness. The type of indentation includes foreign substance indentation generated as a result of biting of foreign substances and Brinell indentation which is formed as a result of rolling elements biting into a raceway ring when excessive load acts on the rolling apparatus, thereby flattening the rolling elements. In the case of the foreign substance indentation, formation of indentation can be prevented by increasing the hardness of a neighborhood of the surface. However, in the case of the Brinell indentation, the hardness of a core of a material as well as the hardness of a surface thereof is important. Indentation is formed by static shearing force (shearing force in a direction at an angle of 45° with respect to the direction of rolling) arising in a material as a result of the raceway ring contacting the rolling elements, thereby imposing load on the rolling elements. A phenomenon of formation of indentation is caused by plastic deformation of the material. Hence, when yield shearing stress of the material is equal to or greater than the static shearing stress, indentation is not formed.

The load acting on the rolling bearing is usually designed so as to be come equal to or less than static rated load. Therefore, it is important for a material to have material strength which prevents formation of indentation even when static rated load acts on the material. In the case of a ball bearing, static rated load is defined as load which causes contact pressure of 4200 MPa for the case of a ball bearing, as well as being defined as load which causes contact pressure of 4000 MPa for the case of a rolling bearing. Indentation does not arise, so long as the static shearing force caused when the contact pressure has acted on the bearing is equal to or smaller than the yield shearing stress of a material of the bearing. In the meantime, the yield shearing stress of the material is proportional to the hardness of the material, and a relationship of $\tau y = 1/6 \times HV$ exists between the yield shearing stress and Vickers hardness.

Figure 5:
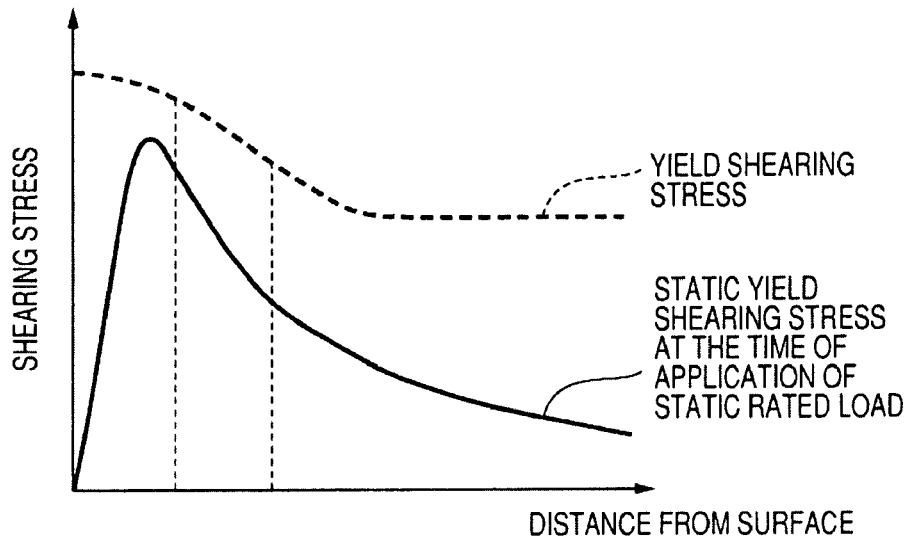
FIG. 5 is a graph showing a relationship between the distribution of static shearing force and yield pressure.

Accordingly, as shown in FIG. 5, in order to prevent formation of Brinell indentation, it is important to set hardness in such a way that a distribution of yield shearing stress (a distribution of hardness) exceeds a distribution of static shearing stress at the time of application of static rated load. In the meantime, an excessive increase in the hardness of the core leads to a decrease in toughness, thereby raising a problem of cracking.

A correlation exists between the depth of action of the maximum static shearing stress (the distribution of static shearing stress) and the diameter of a rolling element, and hence hardness is specified as follows. Specifically, provided that a depth from a raceway surface or a depth from a rolling surface of a rolling element is taken as "Z" and that the diameter of the rolling element is "d,"

the surface hardness of at least one of the inner ring, the outer ring, and the rolling element is set to HV750 or more; preferably to HV800 or more; and more preferably to HV820 or more;

hardness at Z=0.045 d is set to HV650 to 850, and preferably the hardness is set to HV770 to 816; and hardness at Z=0.18 d is set to HV400 to 800, preferably to HV700 to 771, and more preferably to HV718 to 771.

As a result, formation of Brinell indentation, which would otherwise be caused by contacting of the raceway ring with the rolling elements, can be prevented, and longer life of the bearing can be achieved by reducing tangential force acting between the raceway ring and the rolling elements. Applying these requirements to the rolling elements is more preferable.

Figure 6:
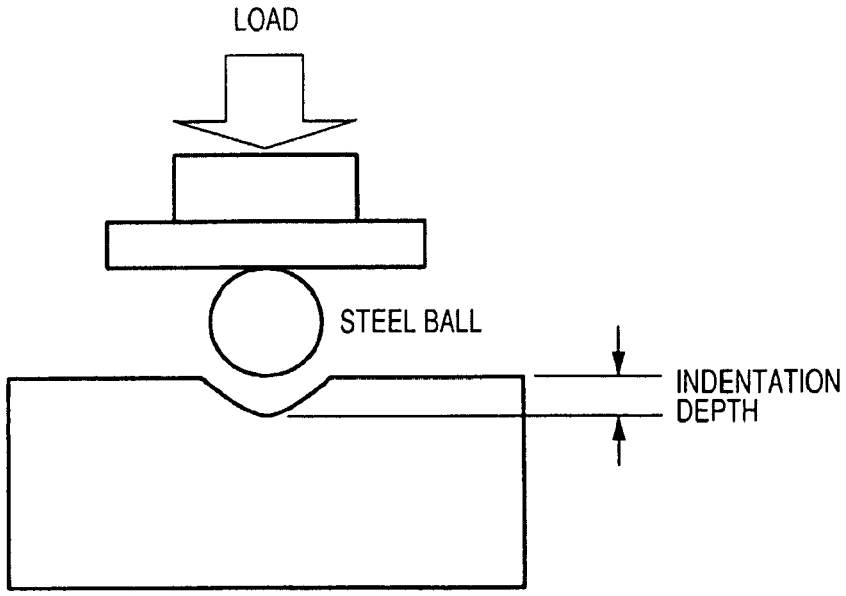
FIG. 6 is a schematic view showing the structure of an indentation resistance test.
Figure 7:
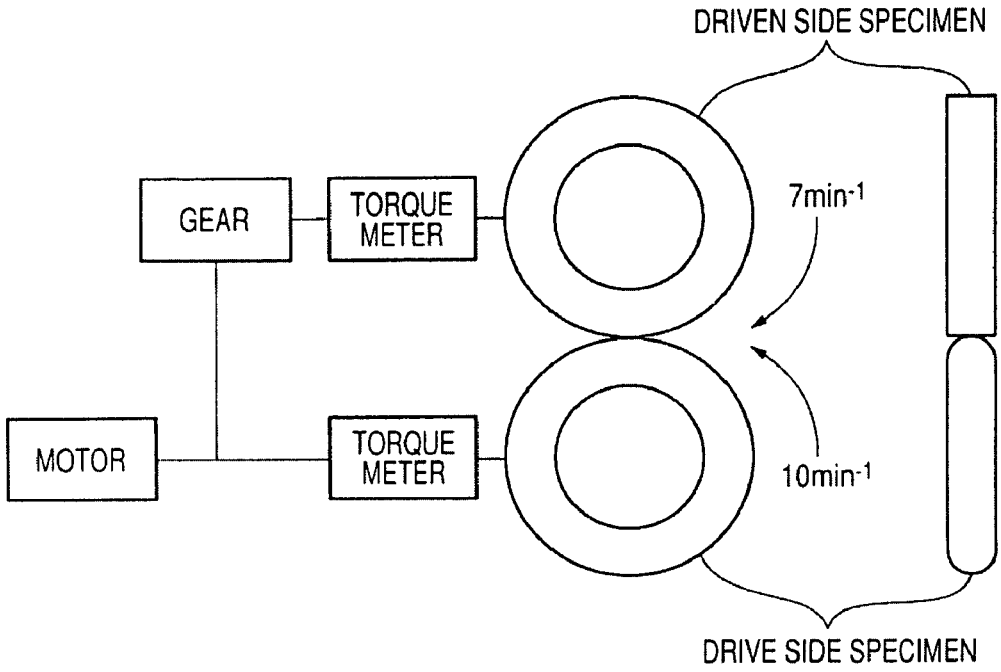
FIG. 7 is a schematic view showing the structure of a two-cylinder abrasion test.

In particular, the surface hardness Hv of the rolling surface of the rolling element is preferably 750 or more, more preferably 800 or more, furthermore preferably 820 or more. The most important fact or of a material for enhancing indentation resistance and abrasion resistance is surface hardness. In order to study the influence of surface hardness on indentation resistance and abrasion resistance, an indentation resistance test shown in FIG. 6 and a two-cylinder abrasion test shown in FIG. 7 were carried out.

The indentation resistance test was conducted by a method for pressing a steel ball having a diameter of 2 mm against a sample at 5 GPa and subsequently measuring the depth of an indentation. In the meantime, the two-cylinder abrasion test was carried out under a method for rotating a drive side (a high-speed side) at 10 $min^{-1}$ under conditions including a contact pressure of 0.8 GPa; rotating a driven side (a low-speed side) at 7 $min^{-1}$ by reducing the speed with a gear, to thus forcefully impart slippage to both the drive side and the driven side. A mean value of amounts of abrasion of the drive side acquired after elapse of 20 hours since initiation of the test and a mean value of amounts of abrasion of the driven side acquired after elapse of 20 hours since initiation of the test were measured.

Figure 8:
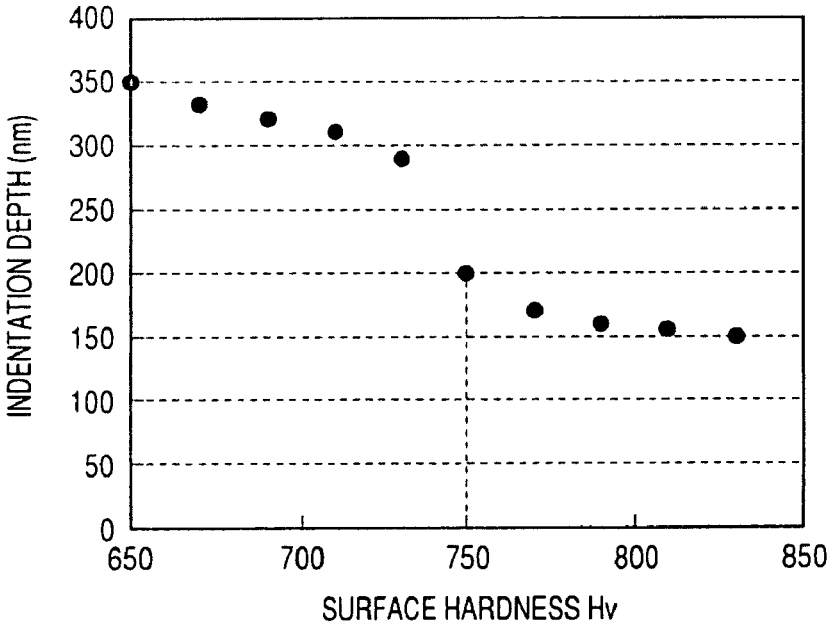
FIG. 8 is a graph showing a relationship between surface hardness and indentation resistance.
Figure 9:
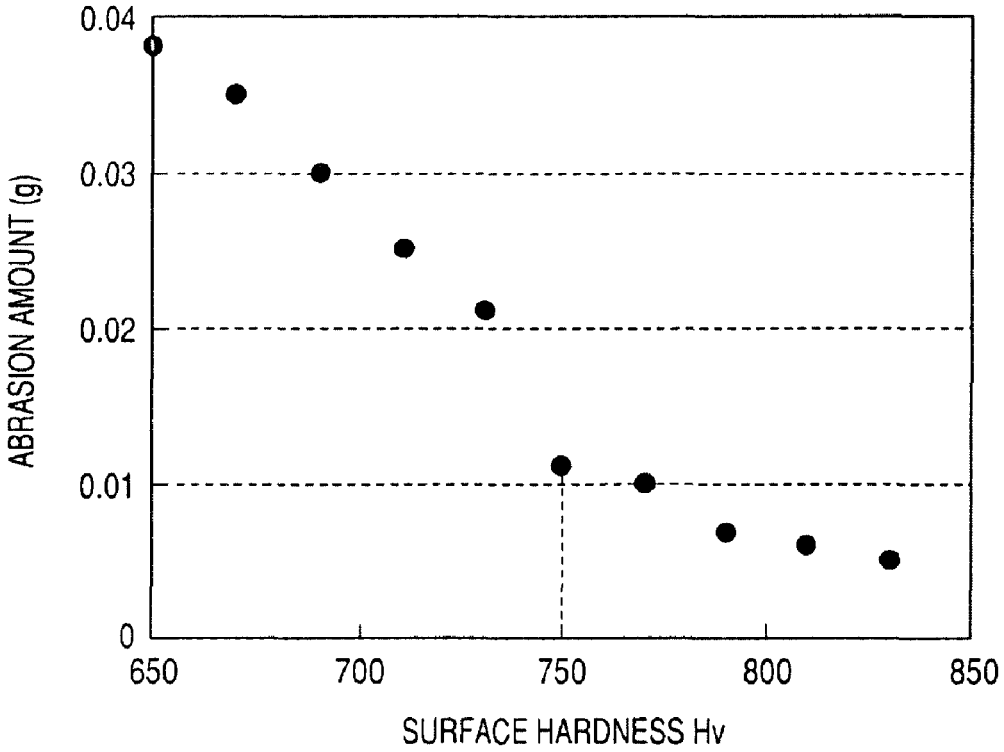
FIG. 9 is a graph showing a relationship between surface hardness and indentation resistance.

FIG. 8 is a graph showing a relationship between surface hardness and an indentation resistance characteristic, and FIG. 9 is a graph showing a relationship between surface hardness and an abrasion resistance characteristic. It is clear from the graphs that the indentation characteristic and the abrasion resistance characteristic become superior as the surface hardness becomes higher. In particular, when the surface hardness is equal to or greater than Hv750, both the indentation resistance characteristic and the abrasion resistance characteristic are extremely superior. Moreover, it has also been known that fatigue strength is higher as surface hardness becomes higher, and an increase in the hardness of the rolling surface of the rolling elements enables enhancement of indentation-originated flaking strength as well as enhancement of the indentation resistance characteristic and the abrasion resistance characteristic.

In the present invention, carbonitriding is performed in order to enrich predetermined nitrogen on the surface layer of the raceway ring or the surface layer of the rolling elements. As in the case of carbon, nitrogen has also the property of forming a nitride or carbonitride to enhance the indentation resistance characteristic and the abrasion resistance characteristic, as well as having the property of intensifying solid-solution of martensite and stable securing of residual austenite.

Figure 10:
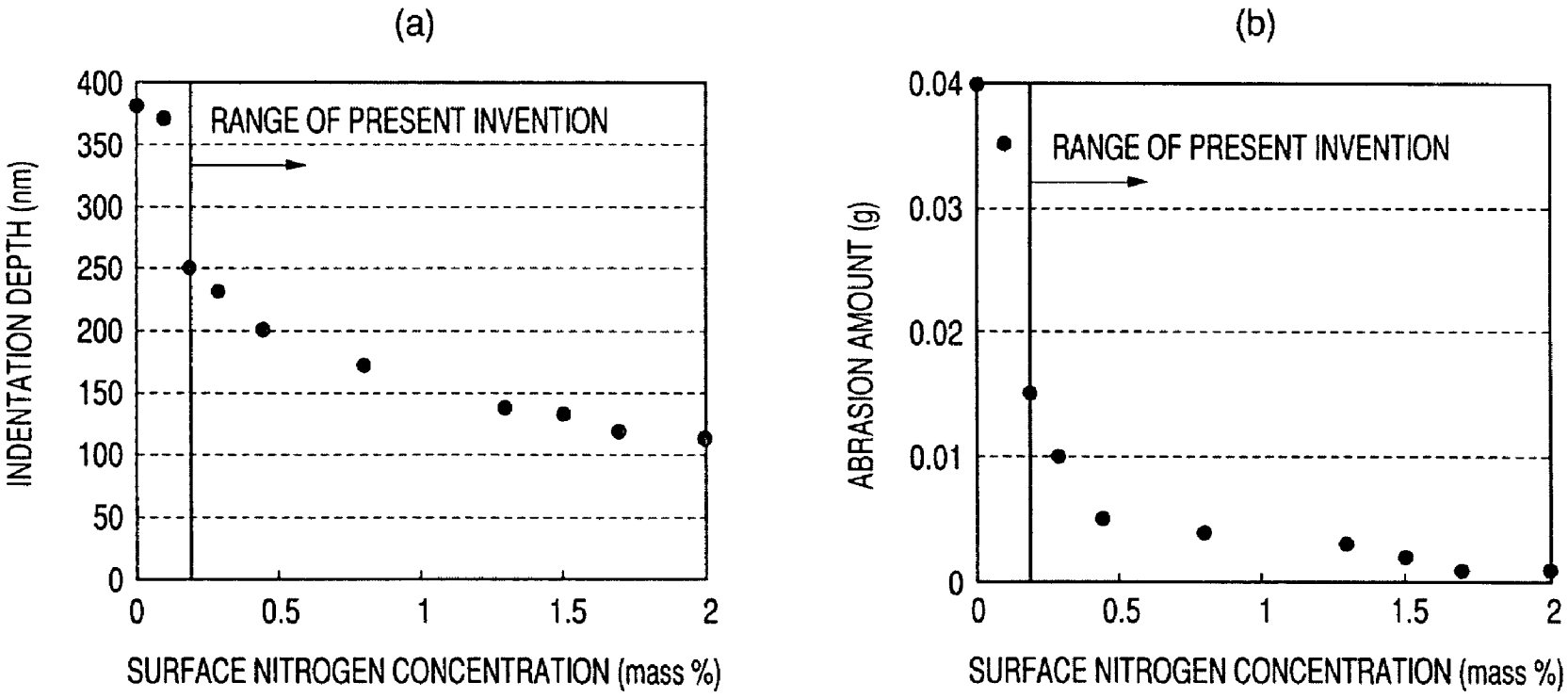
FIG. 10 is a graph showing the influence of the concentration of surface nitride exerted on indentation resistance and abrasion resistance.

FIG. 10 shows the influence of nitrogen exerted on the indentation resistance characteristic and the abrasion resistance characteristic determined by an indentation resistance characteristic test and a two-cylinder abrasion test analogous to those mentioned above. An electron probe micro analyzer (EPMA) is used for measuring the amount of surface nitrogen. In order to investigate only the effect of a nitrogen concentration, hardness and the amount of residual austenite other than the surface nitrogen concentration were held constantly. FIG. 10 shows that the abrasion resistance characteristic and the indentation resistance characteristic become superior with an increase in the surface nitrogen concentration. A noticeable effect appears when the surface nitrogen concentration exceeds 0.2 mass %. However, the surface nitrogen concentration is set to more preferably 0.45 mass % or more.

Figure 11:
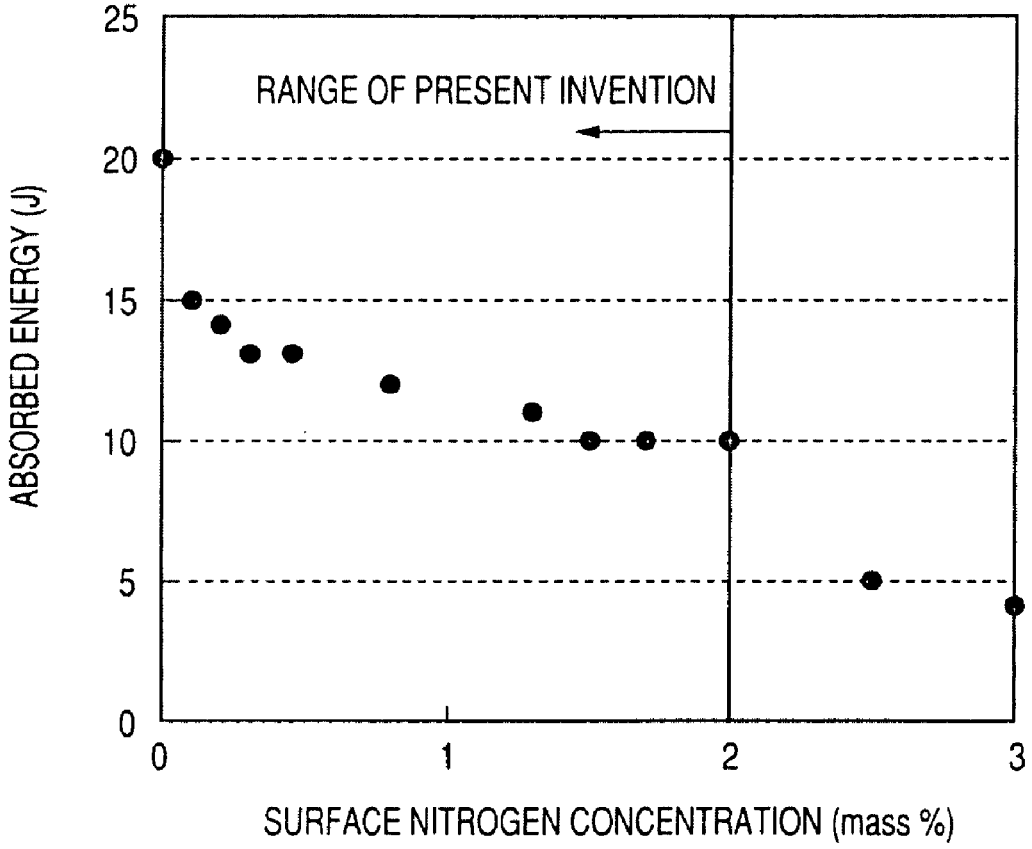
FIG. 11 is a graph showing a relationship between the surface nitrogen concentration acquired through a Charpy impact test and absorbed energy.

In the meantime, an excessively high concentration of nitrogen involves a drawback of a decrease in toughness and static strength. Since toughness and static strength are required performances for the rolling elements of the rolling bearing, an excessively-high concentration of nitrogen is not preferable. FIG. 11 shows results of a Charpy impact test, and it is seen that a drastic drop arises in toughness when the concentration of nitrogen exceeds 2.0 mass %. Accordingly, the upper limit of the nitrogen concentration in the present invention is set to 2.0 mass %.

As mentioned above, it has become clear that the indentation resistance characteristic and the abrasion resistance characteristic of the material are enhanced as the surface nitrogen concentration increases. However, the present inventors also found that, even in the case of the same nitrogen concentration, the indentation resistance characteristic and the abrasion resistance characteristic change according to the state of presence of nitrogen in the material. Nitrogen is present in two cases; namely, a case where nitrogen is present in the form of a solid solution within a material and a case where nitrogen is precipitated as a nitride. Although detailed numerals will be described later, a nitrogen content included in a material in the form of a solid solution becomes greater, even at the same concentration of nitrogen, than a nitrogen content in an Si.Mn-based nitride precipitated on the surface of the material when a material containing large amounts of Si and Mn is carbonitrided.

Figure 12:
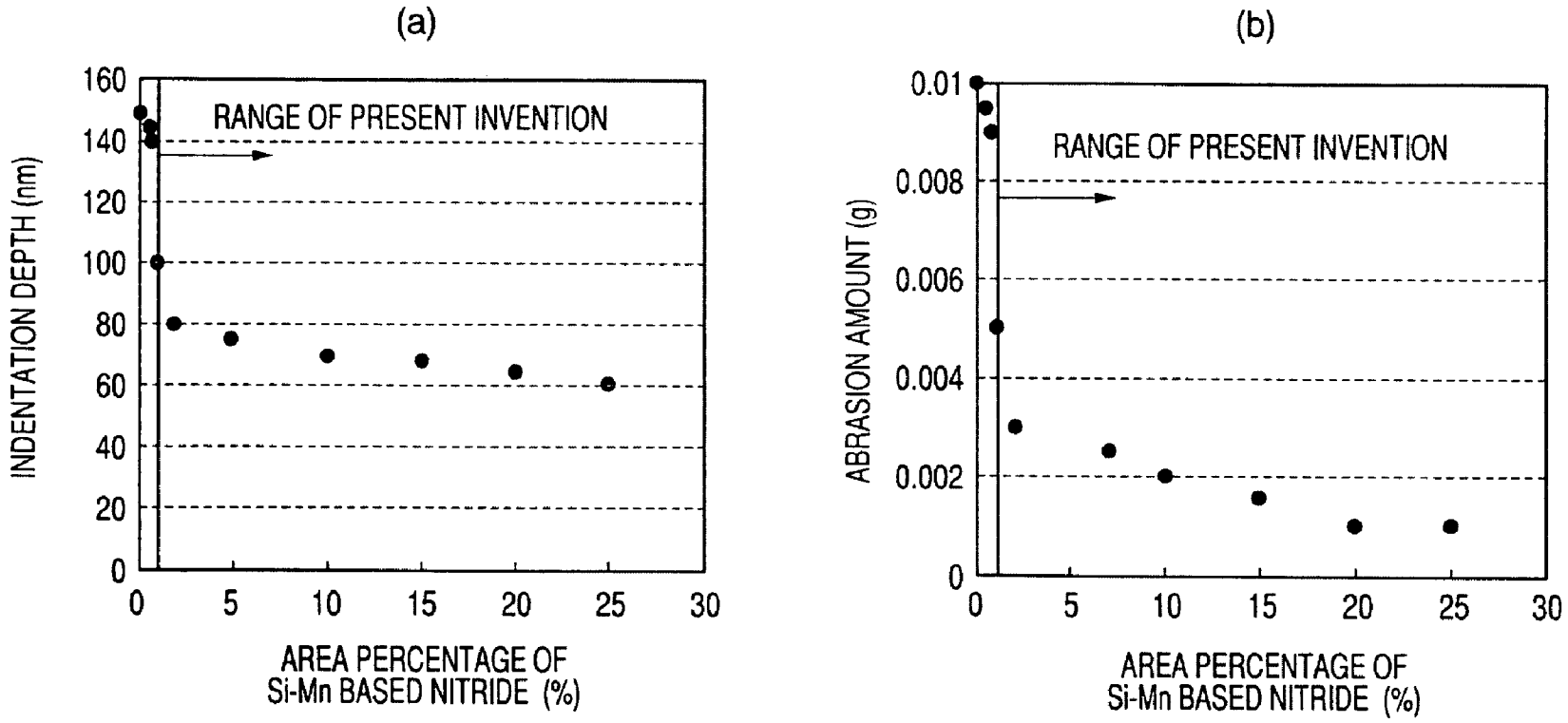
FIG. 12 is a graph showing the influence of an area percentage of a Si.Mn-based nitride exerted on indentation resistance and abrasion resistance.
Figure 13:
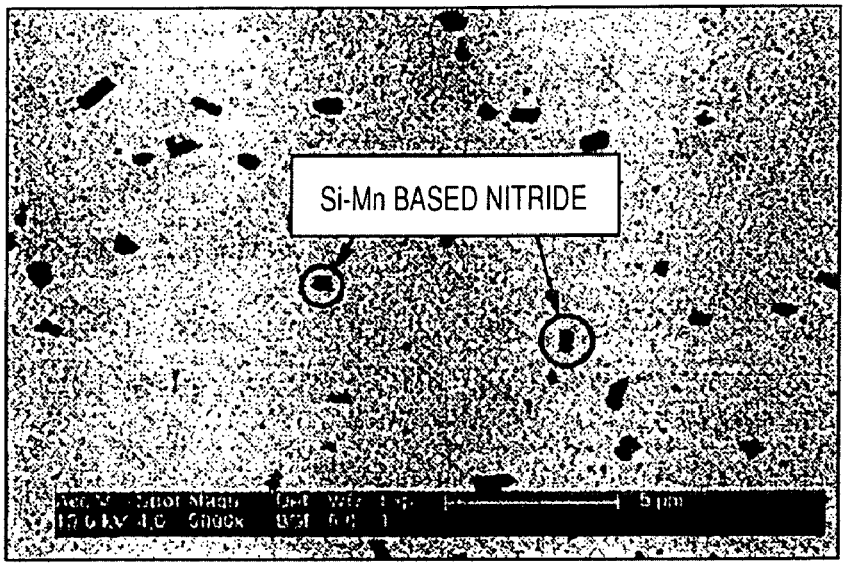
FIG. 13 is an example electron microscope photograph of the surface of a rolling element at the time of measurement of an area percentage of the Si.Mn-based nitride.

FIG. 12 shows area-percentage influence of the Si.Mn-based nitride exerted on the indentation resistance characteristic and the abrasion resistance characteristic determined by the indentation resistance characteristic test and the two-cylinder abrasion test analogous to those mentioned above. In order to investigate only the effect of the Si.Mn-based nitride, hardness, the amount of residual austenite, and the concentration of nitrogen other than the area percentage of the Si.Mn-based nitride are made constant. In relation to measurement of area percentage of the Si.Mn-based nitride, the rolling surface is observed at an accelerated voltage of 10 kV by use of a field emission scanning electron microscope (FE-SEM). After photographs of at least three visual fields (see FIG. 13) have been captured at a 5000 magnification, the photographs are binarized, and an area percentage is computed by use of an image analyzer. As shown in FIG. 12, the abrasion resistance characteristic and the indentation resistance characteristic are superior as the area percentage of the Si.Mn-based nitride increases. When the area percentage of the Si.Mn-based nitride exceeds 1%, an effect noticeably appears. However, an area percentage of 2% or more is more preferable.

In order to investigate the influence of the area percentage of the Si.Mn-based nitride on indentation-originated flaking life, a test was conducted by a thrust life test on condition that lubrication is contaminated with foreign substances. Table 1 shows components of materials used in the test; steel type 1 is a material corresponding to JIS SUJ3; and steel type 2 is a material corresponding to JIS SUJ2. The materials of Table 1 were machined into a disk of which diameter is 65 mm and thickness is 6 mm by turning process. After being subjected to carbonitriding in a gas mixture of an RX gas, a propane gas, and ammonium at 820 to 900° C. for 2 hours to 10 hours, the disk was subjected to oil hardening and subsequently to tempering at 160 to 270° C. for 2 hours. Specimens having various nitrogen concentrations were formed by changing a processing temperature, a processing time, and the flow rate of an ammonium gas. After heat treatment, the surfaces of the specimens were mirror-finished by polishing and lapping.

TABLE 1

| | | C | Si | Mn | Cr |
|---|---|---|---|---|---|
| Present invention | Steel type 1 | 1.01 | 0.56 | 1.10 | 1.10 |
| Comparative example | Steel type 2 | 0.99 | 0.25 | 0.40 | 1.49 |

Test conditions are as follows:

Test load: 5880N (600 kgf)

Number of revolutions: 1000 $min^{-1}$

Lubricating oil: VG68

Hardness of foreign substance; HV870

Size of foreign substance: 74 to 147 μm

Amount of contaminated foreign substance: 200 PPM

Table 2 shows a relationship among the concentration of nitrogen, an area percentage of the Si.Mn-based nitride, and life achieved after contamination. Results of the life test are provided as ratios on condition that life L10 of a comparative example 1 is taken as 1.

TABLE 2

| | | | nitrogen concentration | area percentage | life ratio |
|---|---|---|---|---|---|
| present invention | steel type 1 | 1 | 0.20 | 1.12 | 2.10 |
| | | 2 | 0.30 | 1.56 | 2.20 |
| | | 3 | 0.42 | 2.30 | 3.10 |
| | | 4 | 0.51 | 3.51 | 3.00 |
| | | 5 | 0.64 | 3.65 | 3.20 |
| | | 6 | 0.89 | 4.99 | 3.40 |
| | | 7 | 1.00 | 5.77 | 3.40 |
| | | 8 | 1.44 | 7.55 | 3.50 |
| | | 9 | 1.78 | 9.99 | 3.40 |
| | | 10 | 2.10 | 11.00 | 3.20 |
| comparative example | steel type 2 | 1 | 0.21 | 0.59 | 1.00 |
| | | 2 | 0.28 | 0.77 | 1.10 |
| | | 3 | 0.35 | 0.98 | 1.10 |
| comparative example | steel type 1 | 4 | 2.10 | 11.00 | 3.20 |
| | | 5 | 0.18 | 0.90 | 1.20 |

Figure 14:
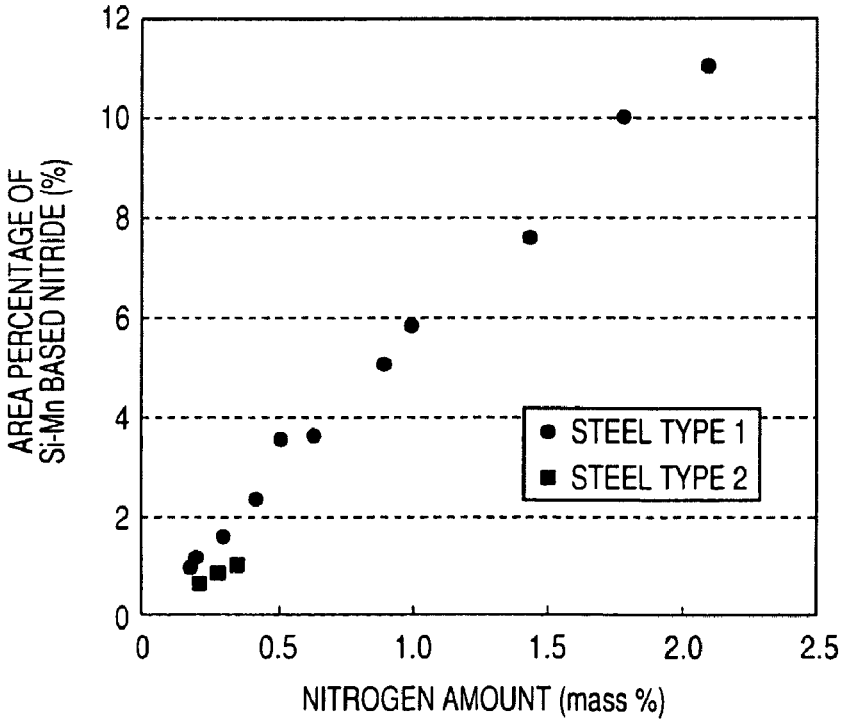
FIG. 14 is a graph showing a relationship between the amount of nitride and an area percentage of the Si.Mn-based nitride.
Figure 15:
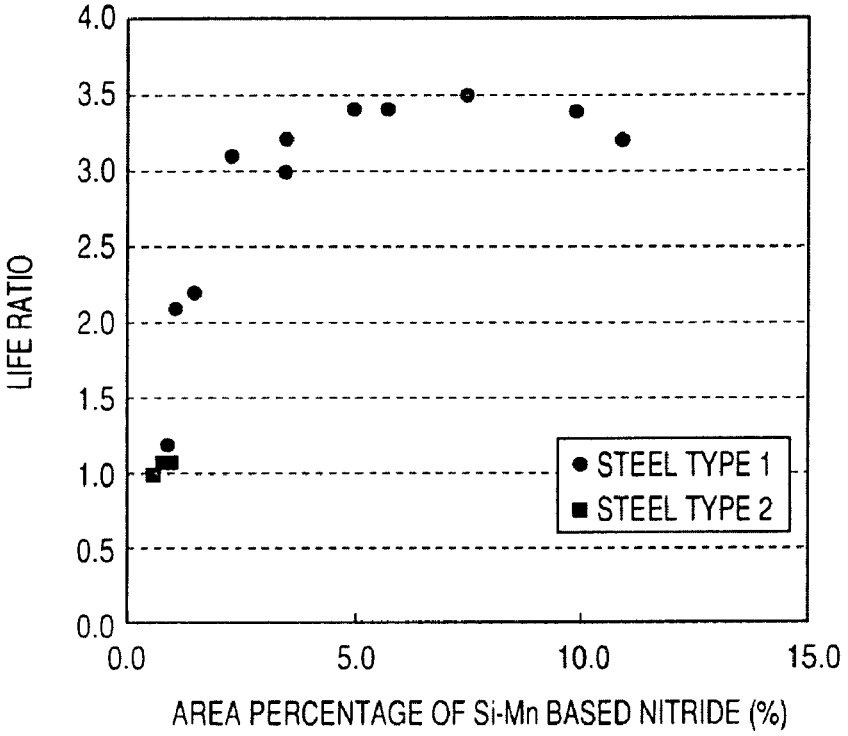
FIG. 15 is a graph showing a relationship between an area percentage of the Si.Mn-based nitride and indentation-originated flaking life.

FIG. 14 shows a relationship between the nitrogen concentrations of the steel types 1 and 2 and the area percentage of the Si.Mn-based nitride, and FIG. 15 shows a relation between the area percentage of the Si.Mn-based nitride and indentation-originated flaking life. The amount of the Si.Mn-based nitride precipitated is understood to increase in proportion to the concentration of nitrogen. Moreover, it is also seen that, when comparison is performed at the same nitrogen amount, larger amounts of precipitated Si.Mn and longer life are achieved by the steel doped with larger amounts of Si and Mn. As in the case of the indentation resistance characteristic and the abrasion resistance characteristic, life is considerably elongated when the area percentage of the Si.Mn-based nitride comes to 1 percent or more and when the nitrogen amount comes to 0.2 mass %.

Figure 16:
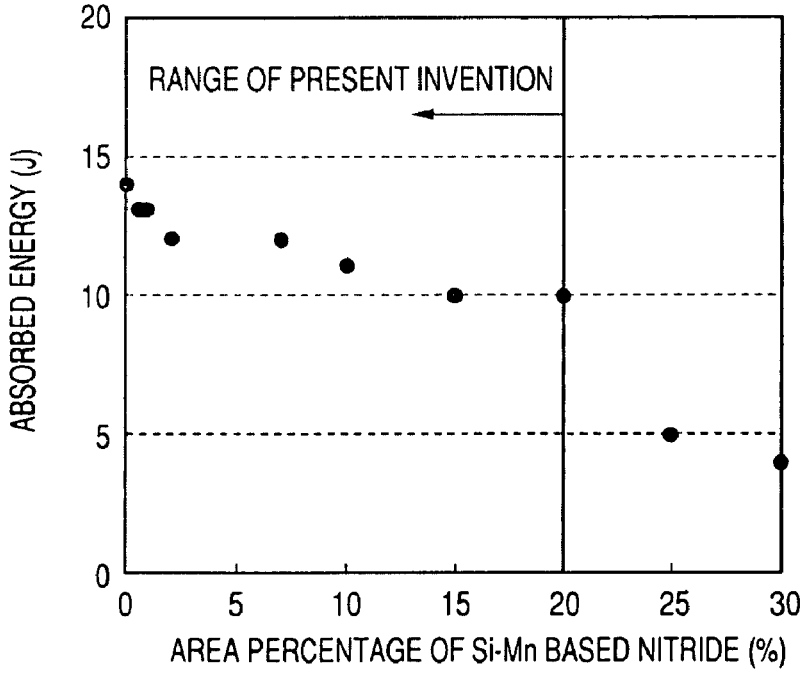
FIG. 16 is a graph showing a relationship between the area percentage of the Si.Mn-based nitride acquired through a Charpy impact test and absorbed energy.

In the meantime, when the amount of precipitated Si.Mn-based nitride becomes excessively large, there arises a drawback of a decrease in toughness and static strength, as in the case of the nitrogen concentration. Since toughness and static strength are required performances for the rolling elements of the rolling bearing, an excessively-large amount of precipitated Si.Mn-based nitride is not preferable. FIG. 16 shows results of a Charpy impact test, and it is seen that a drastic drop arises in toughness when the area percentage of the Si.Mn-based nitride exceeds 20%. Accordingly, the upper limit of the area percentage of the Si.Mn-based nitride in the present invention is 20%, more preferably 10%.

Nitride whose size exceeds 1 μm does not much contribute to strength of the material. The material is strengthened when fine particles of nitride are dispersed. The reason for this is that, since a precipitation having a smaller particle-to-particle distance exhibits superior strengthening capability according to a theory of strengthening precipitation, the particle-to-particle distance becomes relatively shortened and intensified even at the same area percentage of the Si.Mn-based nitride when the number of precipitated particles is large. Specifically, it is better to use steel having a large Si content and a large Mn content and to increase the number of fine nitride particles having a mean particle size of 0.05 μm to 1 μm within the area percentage of the Si.Mn-based nitride ranging from 1 to 20%. A ratio of the Si.Mn-based nitride particles measuring 0.05 to 0.50 μm to the Si.Mn-based nitride having a particle size of 0.05 μm or more is set to 20% or more in terms of the number of particles, thereby enabling further intensification.

Specifically, the Si.Mn-based nitride measuring 0.05 μm to 1 μm is preferably 100 or more within an area of 375 $\mu m^2$. A technique for achieving this state is preferably to set a carbonitriding temperature within a range from 800° C. to 870° C. When the temperature is exceeded, the nitride becomes bulky, so that the number of fine Si.Mn-based nitride particles is decreased. Moreover, when the temperature exceeds the processing temperature, the solubility limit of nitrogen becomes greater, and hence the amount of nitride becomes smaller, whereby there may arise a case where a desired area percentage cannot be obtained. From the beginning of the carbonitriding process, it is better to take a mixed gas atmosphere consisting of the RX gas, an enriched gas, and an ammonium gas; to set the CP value to 1.2 or more; and to set the flow rate of an ammonium gas to at least ⅕ or more of the flow rate of the RX gas. It is desirable that hardening should be performed at an oil temperature from 60 to 120° C. after carbonitriding. When the temperature is higher than the temperature range, it may be the case where sufficient hardness is not obtained. Tempering is performed at a temperature from 160 to 270° C., and the range of surface hardness is set to Hv 740 or more, desirably to Hv780 or more. When necessary, sub-zero treating may also be performed after hardening.

Figure 17:
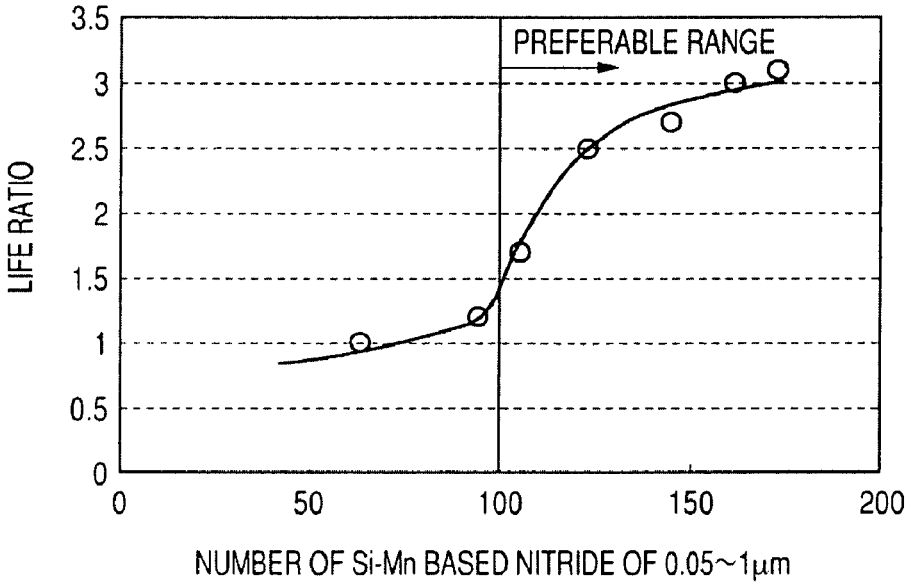
FIG. 17 is a graph showing a relationship between the number of pieces of Si.Mn-based nitride measuring 0.05 to 1 μm and the life thereof.

Table 3 shows a relationship between an area percentage of the Si.Mn-based nitride and the number and life ratio of the Si.Mn-based nitride measuring 0.05 μm to 1 μm, and FIG. 17 shows, in the form of a graph, a relationship between an area percentage of the Si.Mn-based nitride and the number and life ratio of the Si.Mn-based nitride measuring 0.05 μm to 1 μm. As is obvious from the drawing and the table, a base structure is strengthened as a result of lob Si.Mn-based nitride particles or more being dispersed over a measured area of 375 $\mu m^2$, and longer life is achieved despite of contaminated lubrication.

TABLE 3

| | area percentage of Si•Mn based nitride (%) | number of Si•Mn nitride of 0.05-1 μm | life ratio |
|---|---|---|---|
| 1 | 2.05 | 63 | 1 |
| 2 | 2.12 | 94 | 1.2 |
| 3 | 2.98 | 105 | 1.7 |
| 4 | 2.76 | 123 | 2.5 |
| 5 | 3.11 | 145 | 2.7 |
| 6 | 2.56 | 162 | 3 |
| 7 | 2.39 | 173 | 3.1 |

It is desirable that the rolling elements should contain elements provided below.

[C: 0.3 to 1.2 Mass %]

Carbon is an element which is important for ensuring required strength and life of steel. When the amount of carbon is too small, sufficient strength is not attained, and a heat treatment time required to achieve the depth of a quench-hardened layer required at the time of carbonitriding, which will be described later, becomes longer, which in turn results in an increase in the cost of heat treatment. Therefore, a carbon content is set to 0.3 mass % or more, preferably 0.5 mass % or more. In order to achieve hardness of Z=0.18 d, preferably hardness of Z>0.06 d, a carbon content is preferably 0.95 mass % or more. Moreover, when the carbon content is too great, macro carbides are generated at the time of manufacture of steel, which in turn adversely affects a characteristic of subsequent quenching or a rolling fatigue. Moreover, a header characteristic may be decreased, to thus incur an increase in cost. Therefore, the upper limit of the carbon content is set to 1.2 mass %, preferably 1.10 mass %.

[Si: 0.3 to 2.2 Mass %, Mn: 0.2 to 2.0 Mass %]

As mentioned previously, in order to sufficiently precipitate the Si.Mn-based nitride, a steel material having a high Si content and a high Mn content must be used. SUJ2 which is a common bearing material has 0.25% of Si content and 0.4% of Mn content. Even when nitrogen is excessively added to the material by carbonitriding, Si.Mn-based nitride content is low. Therefore, in relation to the Si content and the Mn content, the following values are taken as critical values.

[Si Content: 0.3 to 2.2 Mass %]

Si is an element which is necessary to precipitate an Si.Mn-based nitride. By presence of Si; namely, by addition of 0.3 mass % or more of Si, Si effectively reacts with Mn, to thus become noticeably precipitated. The Si content is set preferably to 0.4 to 0.7 mass %.

[Mn Content: 0.3 to 2.0 Mass %]

Mn is an element necessary to precipitate an Si.Mn-based nitride. By coexistence with Si; namely, addition of 0.3 mass % or more of Mn, Mn exhibits the property of promoting precipitation of an Si.Mn-based nitride. Moreover, Mn has the property of stabilizing austenite. Hence, the Mn content is set to 2.0 mass % or less in order to prevent occurrence of a problem of the amount of austenite still remaining after hardening heat treatment increasing more than necessary. The Mn content is preferably set to 0.9 to 1.15 mass %. More preferably, an Si/Mn ratio is set to a value of five or less for reasons provided below.

Contrary to the nitride stemming from tempering, the Si.Mn-based nitride is formed as a result of nitrogen intruded during carbonitriding process reacting with Si while taking in Mn within a domain of austenite. Accordingly, when an additive amount of Mn is smaller than an additive amount of Si, precipitation of the Si.Mn-based nitride is not promoted even when nitrogen is sufficiently diffused. When 0.2 mass % or more of nitrogen is caused to intrude within the range of the previously-described Si and Mn additive amount, the amount of precipitation of Si.Mn-based nitride having an area percentage of 1.0% or more-which is effective for extension of life and enhancement of the abrasion resistance characteristic and the seizure resistance characteristic-can be ensured by setting the Si/Mn ratio to a value of 5 or less.

[Cr: 0.5 to 2.0 Mass %]

Cr is an element which enhances hardenability and which is used for forming a carbide; promotes precipitation of a carbide which strengthens a material; and further miniaturizes the precipitate further. When the Cr content is less than 0.5 mass %, hardenability is deteriorated, to thus fail to achieve sufficient hardness or make a carbide bulky during carbonitriding process. When the Cr content exceeds 2.0 mass %, a Cr oxide film is formed over the surface of the material during carbonitriding, thereby hindering diffusion of carbon and nitrogen. For these reasons, the Cr content is preferably set to 0.5 mass % to 2.0 mass %; more preferably 0.9 mass % to 1.2 mass %.

At least one type of element selected from Mo, Vi, and V may also be added, as necessary.

[Mo: 0.2 to 1.2 Mass %]

Mo is an element which enhances hardenability and which is used for forming a carbonitride, and has the property of promoting precipitation of a carbide, a carbonitride, and a nitride which strengthens a material and miniaturizes the precipitates further. An effect of Mo becomes noticeable when 0.2 mass % or more of Mo is added. When the Mo content exceeds 1.2 mass %, the effect becomes saturated, and cost increases. Therefore, the Mo content is preferably set to 0.2 mass % to 1.2 mass %.

[Ni: 0.5 to 3.0 Mass %]

Ni has the property of enhancing toughness as well as hardenability, and an effect of Ni becomes noticeable when 0.5 mass % or more of Ni is added. Ni is an element which stabilizes austenite. When 3.0 mass % or more of Ni is added, residual austenite becomes excessive, and the hardness of a core decreases. Accordingly, the Ni content is preferably set to 0.5 mass % to 3.0 mass %.

[V: 0.5 to 1.5 Mass %]

V has the property of forming a hard carbide or carbonitride by carbonitriding, thereby enhancing the abrasion resistance characteristic. This effect becomes noticeable when 0.5 mass % or more of V is added. When 1.5 mass % or more of V is excessively added, V combines with solid-solution carbon of the material to form a carbide, thereby decreasing hardness of the material. Accordingly, the V content is preferably set to 0.5 mass % to 1.5 mass %.

In the present invention, when the amount of retained austenite on the raceway surfaces of the inner and outer rings is taken as $\gamma r_{AB}$ and when the amount of retained austenite on the rolling surface of the rolling elements is taken as $\gamma r_C$, setting of $\gamma r_{AB}-15 \leq \gamma r_C \leq \gamma r_{AB}+15$ ($0 \leq \gamma r_{AB}$, $\gamma r_C \leq 50$) is preferable. A unit of the amount of retained austenite is vol. %.

As mentioned previously, as the amount of residual austenite becomes smaller, the indentation resistance characteristic and the abrasion resistance characteristic are enhanced. In the meantime, it has become evident that, as the amount of retained austenite on the surface becomes greater, the flaking life is extended. Specifically, when consideration is given primarily to rolling elements, the indentation resistance characteristic and the abrasion resistance characteristic of the rolling elements are enhanced with a decrease in the amount of austenite on the surface of the rolling elements. Although the life of the raceway ring is extended, the life of the rolling elements decreases. Accordingly, although austenite is present on the rolling elements in amount optimum for rendering the life of the bearing longest, the optimum range of residual austenite varies according to the amount of retained austenite on the raceway ring. When the amount of retained austenite on the raceway ring is large, the life of the raceway ring becomes longer, and the indentation resistance characteristic of the raceway ring decreases. Tangential force acting between the raceway ring and the rolling elements also becomes greater. Hence, as compared to enhancement of the indentation resistance characteristic and the abrasion resistance characteristic of the raceway ring, extension of the life of the rolling elements becomes required more.

Therefore, when the amount of retained austenite on the raceway ring is large, the amount of retained austenite on the rolling elements must also be increased. Specifically, the range of the amount ($\gamma r_C$) of retained austenite on the rolling elements for achieving the longer life of the bearing varies according to the amount ($\gamma r_{AB}$) of retained austenite on the raceway ring, and hence setting of $\gamma r_{AB}-15 \leq \gamma r_C \leq \gamma r_{AB}+15$ ($0 \leq \gamma r_{AB}, \gamma r_C \leq 50$) is preferable. When the amount of residual austenite is too large, the hardness is reduced, thereby deteriorating the indentation resistance characteristic and the abrasion resistance characteristic as well as dimensional stability for the case where the bearing is used at high temperatures. Therefore, the upper limit for the amount of residual austenite is set to 50 vol. %.

At least one of the inner and outer rings is preferably formed from high-carbon chromium bearing steel; for instance, SUJ2 or SUJ3 specified by Japanese Industrial Standard JIS G4805. Since the quality of the high-carbon chromium bearing steel, including an index of cleanliness of steel, is considerably stable, the raceway ring formed from the high-carbon chromium bearing steel is less vulnerable to internally-originated flaking which originates from inclusions and the like, and the sufficient life of the rolling bearing can be ensured. Moreover, since the material is the high-carbon chromium steel, the hardness of the raceway ring from its surface to core can be made high by appropriately quenching and tempering the steel. In the present invention, the quality of the high-carbon chromium bearing steel is preferably of a level (bearing quality) satisfying a cleanliness regulation stipulated by Japanese industrial Standard JIS G4805. In consideration of a balance between the life and cost of the overall bearing, or the like, use of SUJ2 is preferable because of superior ease of machining achieved when the steel is taken as a raw material, ease of machining achieved after heat treatment of the steel, low cost of the raw material, and the like.

Moreover, it is preferable to form a hardened surface layer section on the raceway surface of the raceway ring by subjecting the raceway ring to heat treatment including carburizing and carbonitriding. Specifically, the hardness of the surface layer section formed on the raceway surface is preferably HRC58 or more, and the hardness of an inner core of the surface layer section is preferably HRC56 or more. Further, both the hardness of the surface layer section and the hardness of the core are preferably HRC60 or more. However, when the hardness is excessively large, toughness decreases to raise the fear of occurrence of cracking. Accordingly, the hardness of the surface layer section is preferably HRC66 or less and more preferably HRC64 or less. Moreover, the hardness of the core is preferably HCR64 or less. The surface layer section used herein designates an area extending from a surface to a depth of 200 μm.

As mentioned previously, it has become evident that, as the surface nitrogen concentration becomes higher, the indentation resistance characteristic and the abrasion resistance characteristic of the material are enhanced. However, the present inventors have further found that, even when the concentration of nitrogen is of the same level, the indentation resistance characteristic changes according to the status of presence of nitrogen in the material. Nitrogen is present in the form of a nitride as well as in the form of a precipitated nitride. When a material containing large amounts of Si and Mn is subjected to nitriding or carbonitriding, nitrogen precipitated on the surface in the form of an Si.Mn-based nitride becomes greater in amount, even at the same concentration of nitrogen, than nitrogen which is present in the form of a solid solution in a material. Therefore, the indentation resistance characteristic is enhanced as a result of an increase in the amounts of Si and Mn in a raw material; especially, when Si and Mn are of 1.0 mass % or more, the indentation resistance characteristic is enhanced conspicuously. The reason for this is that the indentation resistance characteristic is enhanced further even at the same level of the nitrogen concentration when Si and Mn are present in the form of an Si.Mn-based nitride having higher hardness rather than when nitrogen is present in the form of a solid solution in a base structure.

Figure 18:
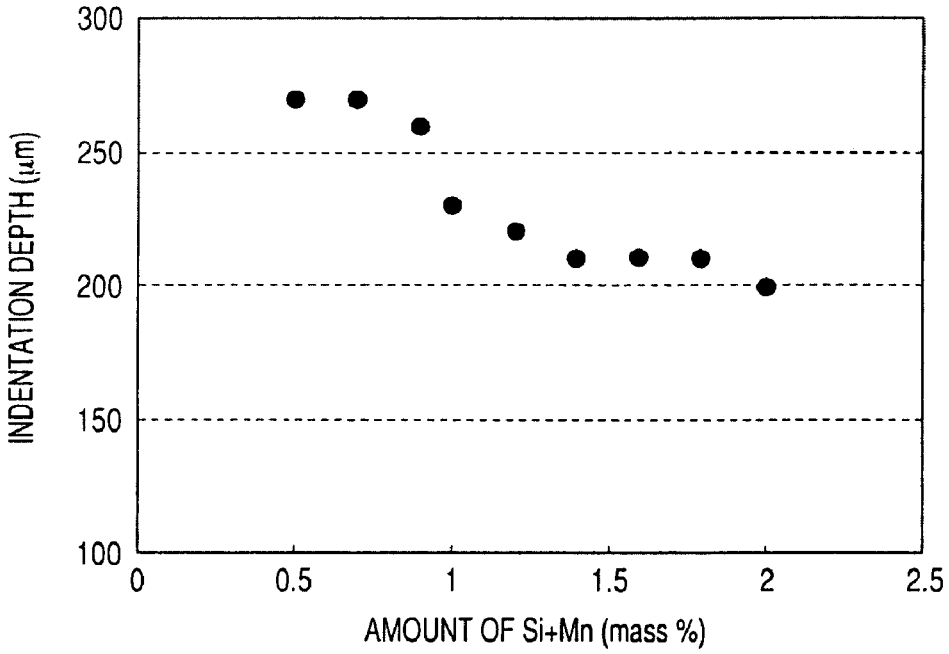
FIG. 18 is a graph showing a relationship between the amount of Si+Mn and the indentation depth.

FIG. 18 shows results of the indentation resistance characteristic tests analogous to that mentioned above which were performed while quantities of Si and Mn in samples were changed. The nitrogen concentration is essentially constant at about 0.3 mass %. As illustrated, the indentation resistance characteristic is enhanced with an increase in the quantities of Si and Mn in a raw material. When the amounts of Si and Mn exceed 1.0 mass %, the indentation resistance characteristic is enhanced noticeably. Therefore, in order to make a raw material less vulnerable to indentation, it is better to set the amounts of Si and Mn in a raw material to 1.0 mass % or more.

Figure 19:
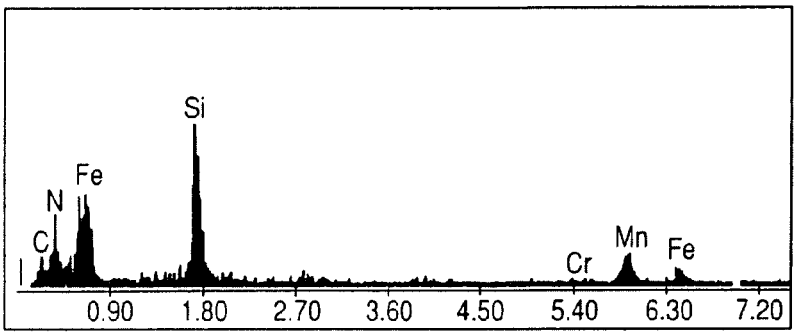
FIG. 19 is an example analysis result of components of the Si.Mn-based nitride.

FIG. 19 shows example results of analysis of components of the Si.Mn-based nitride.

EXAMPLES

Although the present invention will be further described hereunder by examples and comparative examples, the present invention is not limited to these examples.

(First Test)

A life test was carried out in lubrication contaminated with foreign substances by using a conical roller bearing L44649/610 (the diameter of a rolling element d=5.44 mm) as a test bearing after excessive contact pressure of 4000 MPa was exerted on the bearing once. Test conditions are as follows:

Test load: Fr=12 kN, Fa=3.5 kN

Number of revolutions: 3000 $min^{-1}$

Lubricating oil: VG68

Hardness of foreign substance: HV870

Size of foreign substance: 74 to 134 μm

Amount of contaminated foreign substance: 0.1 g

High-carbon chromium bearing steel (SUJ2) was used for inner and outer rings of the test bearing, and the bearing was subjected to carbonitriding for 1 to 3 hours at 830 to 850° C. in an atmosphere consisting of an RX gas, an enriched gas, and an ammonium gas. Subsequently, the bearing was subjected to tempering at 180 to 240° C., whereby three types of bearings: one type of bearing including about 10 vol. % of retained austenite on the raceway surfaces of the inner and outer rings; another type of bearing including about 20 vol. % of retained austenite on the raceway surfaces of the inner and outer rings; and the other type of bearing including about 30 vol. % of retained austenite on the raceway surfaces of the inner and outer rings.

Materials including contents (remainders include iron and inevitable impurities) and surface properties shown in Table 4 were used for the rolling elements. First, a wire containing the components shown in the table was formed through header machining and rough grinding; was subjected to carbonitriding quenching (at 830° C. for 5 to 20 hours in an atmosphere consisting of the RX gas, the enriched gas, and the ammonium gas); and was subjected to tempering heat treatment at 180 to 270° C. and processing pertaining to post-processes. The electron probe micro analyzer (EPMA) was used for measuring the nitrogen amount in the surface of the rolling elements, to thus have performed quantitative analysis. Further, the amount of retained austenite on the surface layer was measured by X-ray diffraction. In either case, the surface of the rolling elements was directly subjected to analysis and measurement. In relation to measurement of area percentage of the Si.Mn-based nitride, the rolling surface was observed at an accelerated voltage of 10 kV by use of the field emission scanning electron microscope (FE-SEM). After capture of photographs of at least three visual fields (see FIG. 13) at a 5000 magnification, the photographs were binarized, and an area percentage was computed by use of the image analyzer. A value of 0.045 d and a value of 0.18 d were measured in relation to the surface hardness of the rolling elements.

Table 4 shows results of life tests of the respective bearings of the examples and the comparative examples. The life tests were performed twelve times for each of the test bearings, thereby studying a life time lasting until occurrence of flaking, preparing a Weibull plot, and determining life L10 from a result of the Weibull distribution. The thus-determined life is taken as a life value. Life is provided in the form of a value of a ratio on condition that the life of a first comparative example having the shortest is taken as one.

Figure 20:
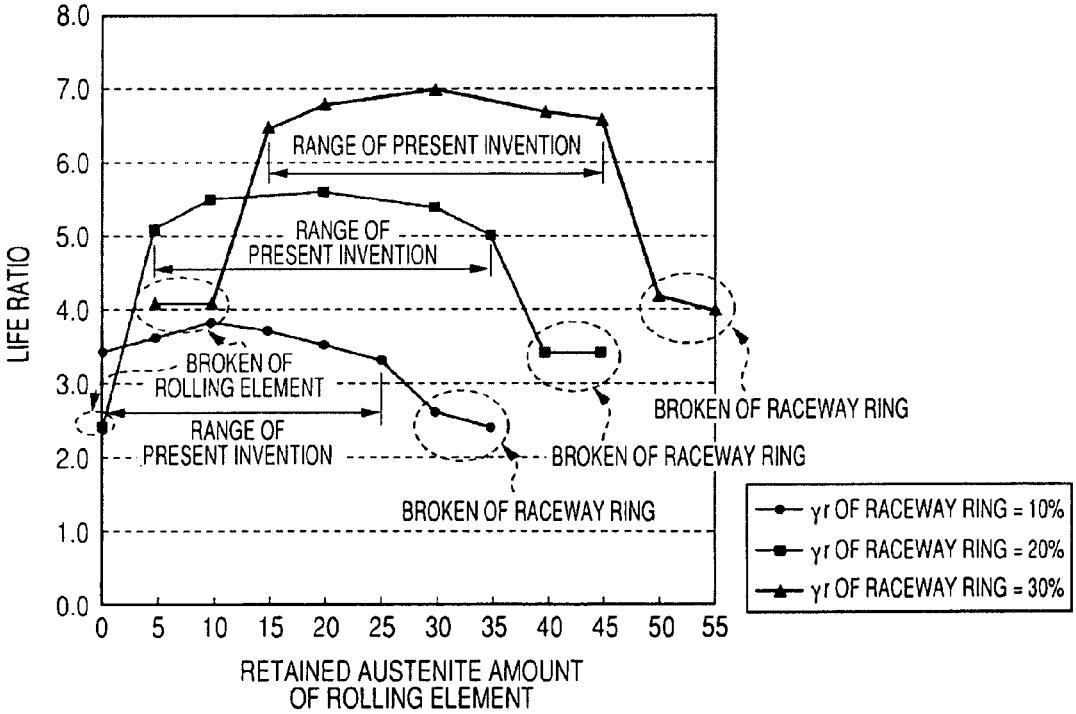
FIG. 20 is a graph showing a relationship between the amount of retained austenite on a rolling element and the life thereof.

FIG. 20 shows a relationship between the amount of retained austenite on the rolling surface of the rolling elements and a life ratio, which is acquired when the residual austenite on the raceway surface of the raceway ring is 10, 20, and 30 vol. %. As the amount of retained austenite on the raceway surface of the raceway ring becomes greater, the bearing tends to exhibit longer life. However, the life is dependent on the amount of retained austenite on the raceway surface of the rolling elements. As a result of the amount of residual austenite on the rolling elements being defined so as to fall within the range of the present invention, the entire bearing achieves longer life. When the amount of residual austenite on the rolling elements is less than the range of the present invention, all of the rolling elements become broken. When the amount of residual austenite is greater than the range of the present invention, all of the raceway rings become broken. It is understood that, by controlling the amount of austenite within the range of the present invention, the life of the rolling elements and the life of the raceway ring are extended in a balanced manner and that the life of the entire bearing can be extended.

As described in Patent Document 1, a result showing that an increase in the amount of residual austenite leads to extension of life in the environment of lubrication contaminated with foreign substances is also acquired even in this test result. However, a mere increase in the amount of residual austenite is not sufficient, and life can be extended by defining the amount of residual austenite on the partner member as described in connection with the present example. Moreover, even when life cannot be extended by increasing the amount of residual austenite for reasons of costs or operating conditions, life can be extended by defining a range where life is extended effectively.

TABLE 4

| | C | Si | Mn | Cr | Si/Mn | Surface hardness of rolling Element HV (kgf/mm$^2$) | Hardness HV at Z = 0.045 d (kgf/mm$^2$) | Hardness HV at Z = 0.18 d (kgf/mm$^2$) | Nitrogen concentration on surface of rolling element mass % | Area percentage of nitride on surface of rolling element (%) | Number of Si•Mn based nitride in 375 μm$^2$ | Amount of retained austenite on raceway surface of raceway ring (vol. %) | Amount of retained austenite on rolling surface of rolling element (vol. %) | rolling life ratio |
|---|---|---|---|---|---|---|---|---|---|---|---|---|---|---|
| example 1 | 1.01 | 0.56 | 1.10 | 1.10 | 0.51 | 795 | 777 | 734 | 0.37 | 2.02 | 140 | 10 | 10 | 2.5 |
| example 2 | 0.30 | 0.60 | 1.00 | 1.10 | 0.60 | 769 | 653 | 405 | 0.40 | 2.35 | 139 | 10 | 10 | 2.1 |
| example 3 | 1.20 | 0.50 | 0.90 | 1.00 | 0.56 | 790 | 779 | 752 | 0.40 | 2.51 | 141 | 10 | 10 | 2.5 |
| example 4 | 1.01 | 0.30 | 0.70 | 1.00 | 0.43 | 786 | 765 | 733 | 0.40 | 1.80 | 138 | 10 | 10 | 2.2 |
| example 5 | 0.99 | 2.20 | 1.00 | 0.93 | 2.20 | 810 | 772 | 726 | 0.45 | 2.95 | 145 | 10 | 10 | 2.6 |
| example 6 | 0.98 | 0.50 | 0.30 | 0.95 | 1.67 | 780 | 761 | 735 | 0.47 | 1.92 | 143 | 10 | 10 | 2.1 |
| example 7 | 1.03 | 1.00 | 2.00 | 0.92 | 0.50 | 822 | 776 | 736 | 0.44 | 3.21 | 149 | 10 | 10 | 2.5 |
| example 8 | 1.10 | 0.40 | 1.15 | 1.20 | 0.35 | 824 | 754 | 747 | 0.42 | 3.46 | 155 | 10 | 10 | 2.6 |
| example 9 | 0.89 | 0.70 | 0.90 | 0.90 | 0.78 | 826 | 738 | 693 | 0.46 | 3.66 | 166 | 10 | 10 | 2.7 |
| example 10 | 1.06 | 0.40 | 0.90 | 1.00 | 0.44 | 818 | 782 | 731 | 0.43 | 3.20 | 162 | 10 | 10 | 2.6 |
| example 11 | 1.07 | 0.40 | 1.15 | 1.10 | 0.35 | 830 | 776 | 740 | 0.40 | 3.54 | 168 | 10 | 10 | 2.7 |
| example 12 | 1.00 | 0.50 | 0.99 | 0.50 | 0.51 | 750 | 742 | 733 | 0.20 | 1.04 | 105 | 10 | 10 | 2.0 |
| example 13 | 1.01 | 0.56 | 1.10 | 1.10 | 0.51 | 830 | 789 | 735 | 0.50 | 5.10 | 180 | 10 | 10 | 2.9 |
| example 14 | 1.01 | 0.56 | 1.10 | 1.10 | 0.51 | 844 | 795 | 732 | 1.12 | 9.82 | 192 | 10 | 10 | 3.0 |
| example 15 | 1.10 | 2.00 | 1.80 | 2.00 | 1.11 | 853 | 797 | 739 | 1.49 | 15.46 | 231 | 10 | 10 | 3.1 |
| example 16 | 1.10 | 2.00 | 1.80 | 2.00 | 1.11 | 859 | 806 | 737 | 1.95 | 19.60 | 256 | 10 | 10 | 3.1 |
| example 17 | 1.01 | 0.56 | 1.10 | 1.10 | 0.51 | 821 | 765 | 705 | 0.45 | 3.57 | 154 | 10 | 0 | 2.5 |
| example 18 | 1.01 | 0.56 | 1.10 | 1.10 | 0.51 | 826 | 773 | 718 | 0.45 | 3.57 | 154 | 10 | 5 | 2.7 |
| example 19 | 1.01 | 0.56 | 1.10 | 1.10 | 0.51 | 832 | 787 | 730 | 0.45 | 3.57 | 154 | 10 | 10 | 2.8 |
| example 20 | 1.01 | 0.56 | 1.10 | 1.10 | 0.51 | 838 | 792 | 744 | 0.45 | 3.57 | 154 | 10 | 15 | 2.7 |
| example 21 | 1.01 | 0.56 | 1.10 | 1.10 | 0.51 | 845 | 799 | 753 | 0.45 | 3.57 | 154 | 10 | 20 | 2.6 |
| example 22 | 1.01 | 0.56 | 1.10 | 1.10 | 0.51 | 847 | 805 | 761 | 0.45 | 3.57 | 154 | 10 | 25 | 2.4 |
| example 23 | 1.01 | 0.56 | 1.10 | 1.10 | 0.51 | 849 | 804 | 764 | 0.45 | 3.57 | 154 | 10 | 30 | 1.8 |
| example 24 | 1.01 | 0.56 | 1.10 | 1.10 | 0.51 | 848 | 810 | 767 | 0.45 | 3.57 | 154 | 10 | 35 | 1.7 |
| example 25 | 1.01 | 0.56 | 1.10 | 1.10 | 0.51 | 821 | 765 | 705 | 0.45 | 3.57 | 154 | 20 | 0 | 2.6 |
| example 26 | 1.01 | 0.56 | 1.10 | 1.10 | 0.51 | 826 | 773 | 718 | 0.45 | 3.57 | 154 | 20 | 5 | 4.3 |
| example 27 | 1.01 | 0.56 | 1.10 | 1.10 | 0.51 | 832 | 787 | 730 | 0.45 | 3.57 | 154 | 20 | 10 | 4.4 |
| example 28 | 1.01 | 0.56 | 1.10 | 1.10 | 0.51 | 845 | 799 | 753 | 0.45 | 3.57 | 154 | 20 | 20 | 4.5 |
| example 29 | 1.01 | 0.56 | 1.10 | 1.10 | 0.51 | 849 | 804 | 764 | 0.45 | 3.57 | 154 | 20 | 30 | 4.3 |
| example 30 | 1.01 | 0.56 | 1.10 | 1.10 | 0.51 | 848 | 810 | 767 | 0.45 | 3.57 | 154 | 20 | 35 | 4.1 |
| example 31 | 1.01 | 0.56 | 1.10 | 1.10 | 0.51 | 851 | 816 | 769 | 0.45 | 3.57 | 154 | 20 | 40 | 2.5 |

TABLE 4-continued

| | C | Si | Mn | Cr | Si/Mn | Surface hardness of rolling Element HV (kgf/mm$^2$) | Hardness HV at Z = 0.045 d (kgf/mm$^2$) | Hardness HV at Z = 0.18 d (kgf/mm$^2$) | Nitrogen concentration on surface of rolling element mass % | Area percentage of nitride on surface of rolling element (%) | Number of Si•Mn based nitride in 375 μm$^2$ | Amount of retained austenite on raceway surface of raceway ring (vol. %) | Amount of retained austenite on rolling surface of rolling element (vol. %) | rolling life ratio |
|---|---|---|---|---|---|---|---|---|---|---|---|---|---|---|
| example 32 | 1.01 | 0.56 | 1.10 | 1.10 | 0.51 | 855 | 815 | 771 | 0.45 | 3.57 | 154 | 20 | 45 | 2.4 |
| example 33 | 1.01 | 0.56 | 1.10 | 1.10 | 0.51 | 826 | 773 | 718 | 0.45 | 3.57 | 154 | 30 | 5 | 3.0 |
| example 34 | 1.01 | 0.56 | 1.10 | 1.10 | 0.51 | 832 | 787 | 730 | 0.45 | 3.57 | 154 | 30 | 10 | 3.2 |
| example 35 | 1.01 | 0.56 | 1.10 | 1.10 | 0.51 | 838 | 792 | 744 | 0.45 | 3.57 | 154 | 30 | 15 | 5.6 |
| example 36 | 1.01 | 0.56 | 1.10 | 1.10 | 0.51 | 845 | 799 | 753 | 0.45 | 3.57 | 154 | 30 | 20 | 5.9 |
| example 37 | 1.01 | 0.56 | 1.10 | 1.10 | 0.51 | 849 | 804 | 764 | 0.45 | 3.57 | 154 | 30 | 30 | 6.1 |
| example 38 | 1.01 | 0.56 | 1.10 | 1.10 | 0.51 | 851 | 816 | 769 | 0.45 | 3.57 | 154 | 30 | 40 | 5.8 |
| example 39 | 1.01 | 0.56 | 1.10 | 1.10 | 0.51 | 855 | 815 | 771 | 0.45 | 3.57 | 154 | 30 | 45 | 5.7 |
| example 40 | 1.01 | 0.56 | 1.10 | 1.10 | 0.51 | 853 | 813 | 770 | 0.45 | 3.57 | 154 | 30 | 50 | 3.2 |
| example 41 | 1.01 | 0.56 | 1.10 | 1.10 | 0.51 | 848 | 815 | 768 | 0.45 | 3.57 | 154 | 30 | 55 | 2.9 |
| comparative example 1 | 0.28 | 0.60 | 1.00 | 1.10 | 0.60 | 731 | 624 | 398 | 0.42 | 4.23 | 140 | 10 | 10 | 1.0 |
| comparative example 2 | 0.99 | 0.25 | 0.40 | 1.49 | 0.63 | 777 | 761 | 744 | 0.21 | 0.59 | 85 | 10 | 10 | 1.1 |
| comparative example 3 | 1.00 | 0.40 | 0.25 | 1.50 | 1.60 | 779 | 748 | 728 | 0.30 | 0.65 | 97 | 10 | 10 | 1.3 |
| comparative example 4 | 1.01 | 0.56 | 1.10 | 1.10 | 0.51 | 780 | 759 | 738 | 0.18 | 0.90 | 45 | 10 | 10 | 1.1 |
| comparative example 5 | 0.99 | 2.00 | 0.30 | 1.20 | 6.67 | 772 | 761 | 747 | 0.42 | 0.78 | 98 | 10 | 10 | 1.2 |

(Second Test)

Various steels were subjected to carbonitriding in a gas mixture consisting of the RX gas, the propane gas, the ammonium gas at 820 to 870° C. for 2 to 10 hours; oil hardening; and tempering at 160 to 270° C. for 2 hours. At that time, steels of examples 42-54 and steels of comparative examples 6-16 shown in Table 5 were manufactured by changing the heat treatment time, the heat treatment temperature, and the flow rate of the ammonium gas. Rolling elements for a JIS6206 deep groove ball bearing were manufactured from the steels, and raceway rings were also manufactured from SUJ2. The life test was conducted under the following conditions.

Test load: 6223N (635 kgf)

Number of revolutions: 3000 min$^{-1}$

Lubricating oil: VG68

Hardness of foreign substance: Hv590

Size of foreign substance: 74 to 147 μm

Amount of contaminated foreign substance: 200 ppm

Table 5 shows, in relation to each of the steels, chemical components, Si/Mn ratio, the concentration of nitrogen, an area percentage of Si.Mn-based nitride, and the number and life of Si.Mn-based nitride of 0.05 μm to 1 μm. Life is shown as a ratio on condition that the life L10 of a comparative example 6 (corresponding to SUJ2) is taken as 1.

TABLE 5

| | chemical composition (mass %) | | | | ratio of | nitrogen concentration | area percentage of | number of nitride of | rolling life | |
|---|---|---|---|---|---|---|---|---|---|---|
| | C | Si | Mn | Cr | Si/Mn | (mass %) | nitride (%) | 0.05-1 μm | ratio | remark |
| example 42 | 1.01 | 0.56 | 1.10 | 1.10 | 0.51 | 0.35 | 2.04 | 138 | 2.0 | central value of SUJ3 |
| example 43 | 1.01 | 0.30 | 0.70 | 1.00 | 0.43 | 0.38 | 2.21 | 120 | 2.2 | Si lower limit |
| example 44 | 0.99 | 2.20 | 1.00 | 0.93 | 2.20 | 0.45 | 2.61 | 150 | 2.3 | Si upper limit |
| example 45 | 0.98 | 0.50 | 0.30 | 0.95 | 1.67 | 0.53 | 3.06 | 167 | 2.5 | Mn lower limit |
| example 46 | 1.03 | 1.00 | 2.00 | 0.92 | 0.50 | 0.61 | 3.52 | 153 | 2.5 | Mn upper limit |
| example 47 | 1.00 | 0.50 | 0.99 | 0.50 | 0.51 | 0.20 | 1.04 | 102 | 2.6 | N % area percentage lower limit |
| example 48 | 1.10 | 1.98 | 0.89 | 2.00 | 2.22 | 1.90 | 9.55 | 187 | 3.1 | N % area percentage lower limit |
| example 49 | 0.90 | 1.45 | 0.71 | 1.05 | 2.04 | 1.01 | 5.80 | 180 | 2.9 | |
| example 50 | 1.20 | 0.58 | 0.78 | 1.02 | 0.74 | 0.55 | 3.18 | 168 | 2.9 | |
| example 51 | 1.10 | 0.40 | 1.15 | 1.20 | 0.35 | 0.60 | 3.46 | 171 | 2.9 | SUJ3 Si lower limit |
| example 52 | 0.89 | 0.70 | 0.90 | 0.90 | 0.78 | 0.48 | 2.78 | 145 | 2.5 | SUJ3 Si upper limit |
| example 53 | 1.06 | 0.40 | 0.90 | 1.00 | 0.44 | 0.33 | 1.92 | 143 | 2.6 | SUJ3 Mn lower limit |
| example 54 | 1.07 | 0.40 | 1.15 | 1.10 | 0.35 | 0.40 | 2.21 | 126 | 2.3 | SUJ3 Mn upper limit |
| comparative example 6 | 0.99 | 0.25 | 0.40 | 1.49 | 0.63 | 0.21 | 0.59 | 98 | 1.0 | outlier Si (SUJ2) |

TABLE 5-continued

| | chemical composition (mass %) | | | | ratio of | nitrogen concentration | area percentage of | number of nitride of | rolling life | |
|---|---|---|---|---|---|---|---|---|---|---|
| | C | Si | Mn | Cr | Si/Mn | (mass %) | nitride (%) | 0.05-1 μm | ratio | remark |
| comparative example 7 | 1.00 | 0.40 | 0.25 | 1.50 | 1.60 | 0.30 | 0.65 | 74 | 1.3 | outlier Mn |
| comparative example 8 | 0.99 | 2.00 | 0.30 | 1.20 | 6.67 | 0.42 | 0.78 | 53 | 1.2 | outlier ratio |
| comparative example 9 | 0.98 | 2.00 | 0.40 | 1.00 | 5.00 | 0.46 | 0.80 | 33 | 1.1 | outlier ratio |
| comparative example 10 | 1.01 | 0.56 | 1.10 | 1.10 | 0.51 | 0.18 | 0.90 | 41 | 1.1 | outlier nitrogen |
| comparative example 11 | 1.00 | 0.80 | 0.30 | 1.45 | 2.67 | 0.43 | 2.45 | 157 | 2.3 | |
| comparative example 12 | 1.10 | 1.05 | 0.30 | 1.11 | 3.50 | 0.45 | 2.56 | 143 | 2.5 | |
| comparative example 13 | 0.90 | 1.00 | 1.20 | 0.90 | 0.83 | 0.50 | 2.94 | 129 | 2.5 | |
| comparative example 14 | 1.20 | 1.21 | 0.31 | 1.51 | 3.90 | 0.34 | 2.02 | 110 | 2.6 | |
| comparative example 15 | 1.10 | 1.20 | 0.40 | 2.00 | 3.00 | 0.38 | 2.25 | 177 | 2.7 | |
| comparative example 16 | 0.89 | 1.73 | 0.41 | 1.00 | 4.22 | 0.50 | 2.84 | 151 | 2.6 | |

Figure 21:
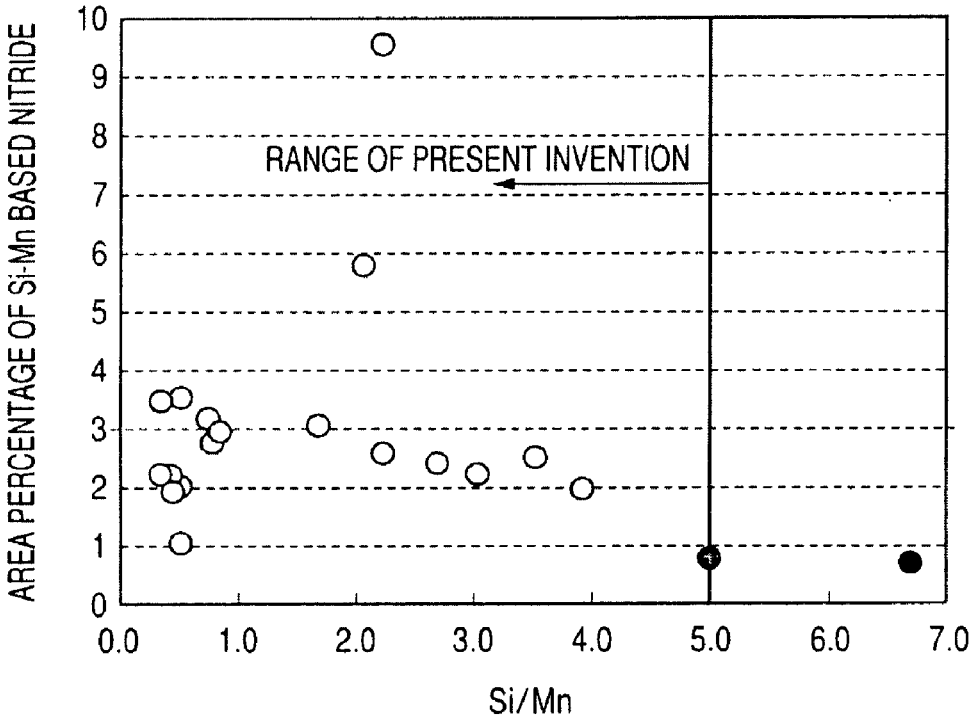
FIG. 21 is a graph showing a relationship between a ratio of a Si/Mn and the area percentage of the Si.Mn-based nitride.

As is clear from Table 5, in the case of the embodiments where the steels falling within the range of the present invention are used and where the number of the Si.Mn-based nitride particles having a nitrogen concentration of 0.2 to 2.0 mass %, an Si.Mn-based nitride area percentage of 1 to 10%, and a size of 0.05 to 1 μm is 100 or more, a life-extending effect is greater than that found in the comparative examples. FIG. 21 shows, in the form of a graph, a relationship between the Si/Mn ratio and the area percentage of the Si.Mn-based nitride in the table. Although the eighth and ninth comparative examples use the steels falling within the range of the present invention and also adopt the nitrogen concentration set to 0.2 mass % or more, the Mn content is smaller than the Si content, and the amount of deposited Si.Mn-based nitride is an area percentage of less than one percent. As is obvious from FIG. 21, precipitation of the Si.Mn-based nitride can be promoted by setting the Si/Mn ratio to a value of five or less.

(Third Test)

A conical roller bearing (bearing number L44649/610) was prepared. As shown in Table 6, in the examples 67 to 100 and the comparative examples 18, 19, the inner and outer rings were formed from high-carbon chromium bearing steel (SUJ2) and subjected to heat treatment including carbonitriding, and carburizing or quenching and tempering. During carbonitriding, the rings were held at 830 to 850° C. for 1 to 3 hours in an atmosphere consisting of the RX gas, the enriched gas, and the ammonium gas. During carburizing, the rings were held at 830 to 850° C. for 1 to 3 hours in an atmosphere consisting of the RX gas and the enriched gas. During quenching, the rings were held at 830 to 850° C. for 1 hour in an atmosphere of the RX gas and then subjected to oil cooling. Further, during tempering, the rings were left to cool after held at 180 to 240° C. By such a heat treatment, the amount of retained austenite on the raceway surfaces of the inner and outer rings is set to 10, 20 and 30 vol. %.

In the meantime, in the seventeenth comparative example, the inner and outer rings were formed from wp case-hardened steel SCr420 and subjected to heat treatment carburizing and tempering. During carburizing, the rings were held at 920 to 950° C. for 3 to 8 hours in an atmosphere consisting of the RX gas and the enriched gas and then subjected to oil cooling. During tempering, the rings were held at 180 to 240° C. and subsequently left to cool.

The steels having the compositions shown in Table 6 were used for the rolling elements, and member having the shape of a conical roller were manufactured from a steel wire by header machining and rough grinding. The members were subjected to carbonitrided quenching at 830° C. for 5 to 20 hours in an atmosphere consisting of the RX gas, the enriched gas, and the ammonium gas, and subsequently to tempering at 180 to 270° C. The members were subjected to processing pertaining to post-processes, such as finishing, whereby rolling elements were obtained.

In relation to the conical roller bearings mentioned above, there were measured the surface hardness HRC (the hardness of the surface layer section) of the raceway surface of the raceway ring, the hardness HRC of the core of the raceway ring (core hardness), the amount of retained austenite on the raceway surface of the raceway ring, the surface hardness Hv (the hardness of the surface layer section) of the rolling surface of the rolling element, the amount of retained austenite on the rolling surface of the rolling element, the concentration of nitrogen on the surface layer section of the rolling element, and the amount of the Si.Mn-based nitride deposited on the surface layer section of the rolling element (an area percentage).

The concentration of nitrogen was measured by use of the electron probe micro analyzer (EPMA). Further, the amount of retained austenite on the surface layer was measured by X-ray diffraction. In either case, the surface of the rolling elements was directly subjected to analysis and measurement. The amount of the Si.Mn-based nitride was measured by use of the field emission scanning electron microscope (FE-SEM). Specifically, the rolling surface was observed at an accelerated voltage of 10 kV; photographs of at least three visual fields at a 5000 magnification; the photographs were binarized; and the amount of the Si.Mn-based nitride was computed in the form of an area percentage by use of the image analyzer. Hardness was measured by a hardness meter. Results are provided in Table 6.

The conical roller bearings were subjected to the life test and an excessive static load-carrying test. The life test was conducted by rotating the conical roller bearings in the environment of lubrication contaminated with foreign substances and under the following conditions. A rotation time elapsing until flaking arises in the raceway surface of the raceway ring or the rolling surface of the rolling elements is taken as life. Twelve bearings were tested for one type of bearing, and a Weibull plot was prepared. Life L10 was determined from a Weibull distribution of results, and the thus-determined life was taken as life. Table 6 shows results, but the results are provided as relative values acquired when the life of the eighteenth comparative example having the shortest is taken as one.

Radial load: 12 kN

Axial load: 3.5 kN

Rotational speed: 3000 $min^{-1}$

Lubricant: lubricating oil whose ISO viscosity grade is ISO VG68 (contaminated with 200 ppm fine particles having hardness of Hv870 and a particle size of 74 to 134 μm)

The excessive static load-carrying test was conducted by exerting 32 kN of radial load on the conical roller bearing analogous to that used in the life test for 30 seconds, thereby causing permanent deformation in the raceway ring and the conical roller. After removal of the load, the permanent deformation occurred in the inner ring and the permanent deformation occurred in the center of the conical roller were measured. A sum of the amounts of permanent deformation of both the inner ring and the conical roller was computed, and the thus-computed sum was taken as the amount of permanent deformation in the conical roller bearing. The amount of permanent deformation was measured by use of Form Talysurf manufactured by Talor Hobson Ltd. Table 6 shows results, but the results are provided as relative values acquired when the value of the seventeenth comparative example exhibiting the greatest amount of permanent deformation is taken as one.

TABLE 6

| | contents in steel (mass %) | | | | raceway ring (1) | | | | rolling element (2) | | | | | amount of |
|---|---|---|---|---|---|---|---|---|---|---|---|---|---|---|
| | C | Si | Mn | Cr | heat treatment | surface hardness | core hardness | $\gamma_R$ | $\gamma_R$ | surface hardness | nitrogen concentrate | amount of nitride | life | permanent deformation |
| example 55 | 1.01 | 0.56 | 1.10 | 1.10 | carbonitride | 64 | 62 | 10 | 10 | 795 | 0.37 | 2.02 | 5.0 | 0.29 |
| example 56 | 0.30 | 0.60 | 1.00 | 1.10 | carbonitride | 64 | 62 | 10 | 10 | 769 | 0.40 | 2.35 | 4.2 | 0.31 |
| example 57 | 1.20 | 0.50 | 0.90 | 1.00 | carbonitride | 64 | 62 | 10 | 10 | 790 | 0.40 | 2.51 | 5.0 | 0.32 |
| example 58 | 1.01 | 0.30 | 0.70 | 1.00 | carbonitride | 64 | 62 | 10 | 10 | 786 | 0.40 | 1.80 | 4.4 | 0.31 |
| example 59 | 0.99 | 2.20 | 1.00 | 0.93 | carbonitride | 64 | 62 | 10 | 10 | 810 | 0.45 | 2.95 | 5.2 | 0.28 |
| example 60 | 0.98 | 0.50 | 0.30 | 0.95 | carbonitride | 64 | 62 | 10 | 10 | 780 | 0.47 | 1.92 | 4.2 | 0.30 |
| example 61 | 1.03 | 1.00 | 2.00 | 0.92 | carbonitride | 64 | 62 | 10 | 10 | 822 | 0.44 | 3.21 | 5.0 | 0.28 |
| example 62 | 1.10 | 0.40 | 1.15 | 1.20 | carbonitride | 64 | 62 | 10 | 10 | 824 | 0.42 | 3.46 | 5.2 | 0.26 |
| example 63 | 0.89 | 0.70 | 0.90 | 0.90 | carbonitride | 64 | 62 | 10 | 10 | 826 | 0.46 | 3.66 | 5.4 | 0.26 |
| example 64 | 1.06 | 0.40 | 0.90 | 1.00 | carbonitride | 64 | 62 | 10 | 10 | 818 | 0.43 | 3.20 | 5.2 | 0.26 |
| example 65 | 1.07 | 0.40 | 1.15 | 1.10 | carbonitride | 64 | 62 | 10 | 10 | 830 | 0.40 | 3.54 | 5.4 | 0.25 |
| example 66 | 1.00 | 0.50 | 0.99 | 0.50 | carbonitride | 64 | 62 | 10 | 10 | 750 | 0.20 | 1.04 | 4.0 | 0.34 |
| example 67 | 1.01 | 0.56 | 1.10 | 1.10 | carbonitride | 64 | 62 | 10 | 10 | 830 | 0.50 | 5.10 | 5.8 | 0.22 |
| example 68 | 1.01 | 0.56 | 1.10 | 1.10 | carbonitride | 64 | 62 | 10 | 10 | 844 | 1.12 | 9.82 | 6.0 | 0.21 |
| example 69 | 1.10 | 2.00 | 1.80 | 2.00 | carbonitride | 64 | 62 | 10 | 10 | 853 | 1.49 | 15.46 | 6.2 | 0.21 |
| example 70 | 1.10 | 2.00 | 1.80 | 2.00 | carbonitride | 64 | 62 | 10 | 10 | 859 | 1.95 | 19.60 | 6.2 | 0.20 |
| example 71 | 1.01 | 0.56 | 1.10 | 1.10 | carbonitride | 64 | 62 | 10 | 0 | 821 | 0.45 | 3.57 | 5.0 | 0.27 |
| example 72 | 1.01 | 0.56 | 1.10 | 1.10 | carbonitride | 64 | 62 | 10 | 5 | 826 | 0.45 | 3.57 | 5.4 | 0.26 |
| example 73 | 1.01 | 0.56 | 1.10 | 1.10 | carbonitride | 64 | 62 | 10 | 10 | 832 | 0.45 | 3.57 | 5.6 | 0.25 |
| example 74 | 1.01 | 0.56 | 1.10 | 1.10 | carbonitride | 64 | 62 | 10 | 15 | 838 | 0.45 | 3.57 | 5.4 | 0.26 |
| example 75 | 1.01 | 0.56 | 1.10 | 1.10 | carbonitride | 64 | 62 | 10 | 20 | 845 | 0.45 | 3.57 | 5.2 | 0.26 |
| example 76 | 1.01 | 0.56 | 1.10 | 1.10 | carbonitride | 64 | 62 | 10 | 25 | 847 | 0.45 | 3.57 | 4.8 | 0.24 |
| example 77 | 1.01 | 0.56 | 1.10 | 1.10 | carbonitride | 64 | 62 | 10 | 30 | 849 | 0.45 | 3.57 | 3.6 | 0.23 |
| example 78 | 1.01 | 0.56 | 1.10 | 1.10 | carbonitride | 64 | 62 | 10 | 35 | 848 | 0.45 | 3.57 | 3.4 | 0.23 |
| example 79 | 1.01 | 0.56 | 1.10 | 1.10 | carbonitride | 64 | 62 | 20 | 0 | 821 | 0.45 | 3.57 | 5.2 | 0.28 |
| example 80 | 1.01 | 0.56 | 1.10 | 1.10 | carbonitride | 64 | 62 | 20 | 5 | 826 | 0.45 | 3.57 | 8.6 | 0.25 |
| example 81 | 1.01 | 0.56 | 1.10 | 1.10 | carbonitride | 64 | 62 | 20 | 10 | 832 | 0.45 | 3.57 | 8.8 | 0.25 |
| example 82 | 1.01 | 0.56 | 1.10 | 1.10 | carbonitride | 64 | 62 | 20 | 20 | 838 | 0.45 | 3.57 | 9.0 | 0.26 |
| example 83 | 1.01 | 0.56 | 1.10 | 1.10 | carbonitride | 64 | 62 | 20 | 30 | 845 | 0.45 | 3.57 | 8.6 | 0.22 |
| example 84 | 1.01 | 0.56 | 1.10 | 1.10 | carbonitride | 64 | 62 | 20 | 35 | 847 | 0.45 | 3.57 | 8.2 | 0.22 |
| example 85 | 1.01 | 0.56 | 1.10 | 1.10 | carbonitride | 64 | 62 | 20 | 40 | 849 | 0.45 | 3.57 | 5.0 | 0.21 |
| example 86 | 1.01 | 0.56 | 1.10 | 1.10 | carbonitride | 64 | 62 | 20 | 45 | 848 | 0.45 | 3.57 | 4.8 | 0.21 |
| example 87 | 1.01 | 0.56 | 1.10 | 1.10 | carbonitride | 64 | 62 | 30 | 5 | 832 | 0.45 | 3.57 | 6.0 | 0.24 |
| example 88 | 1.01 | 0.56 | 1.10 | 1.10 | carbonitride | 64 | 62 | 30 | 10 | 838 | 0.45 | 3.57 | 6.4 | 0.23 |
| example 89 | 1.01 | 0.56 | 1.10 | 1.10 | carbonitride | 64 | 62 | 30 | 15 | 845 | 0.45 | 3.57 | 11.2 | 0.23 |
| example 90 | 1.01 | 0.56 | 1.10 | 1.10 | carbonitride | 64 | 62 | 30 | 20 | 847 | 0.45 | 3.57 | 11.8 | 0.23 |
| example 91 | 1.01 | 0.56 | 1.10 | 1.10 | carbonitride | 64 | 62 | 30 | 30 | 849 | 0.45 | 3.57 | 12.2 | 0.22 |
| example 92 | 1.01 | 0.56 | 1.10 | 1.10 | carbonitride | 64 | 62 | 30 | 40 | 848 | 0.45 | 3.57 | 11.6 | 0.22 |
| example 93 | 1.01 | 0.56 | 1.10 | 1.10 | carbonitride | 64 | 62 | 30 | 45 | 847 | 0.45 | 3.57 | 11.4 | 0.23 |
| example 94 | 1.01 | 0.56 | 1.10 | 1.10 | carbonitride | 64 | 62 | 30 | 50 | 849 | 0.45 | 3.57 | 6.4 | 0.24 |
| example 95 | 1.01 | 0.56 | 1.10 | 1.10 | carbonitride | 64 | 62 | 30 | 55 | 848 | 0.45 | 3.57 | 5.8 | 0.22 |
| example 96 | 1.01 | 0.56 | 1.10 | 1.10 | carburize | 63 | 62 | 10 | 15 | 795 | 0.37 | 2.02 | 5.0 | 0.44 |
| example 97 | 1.01 | 0.56 | 1.10 | 1.10 | quench | 62 | 62 | 10 | 10 | 795 | 0.37 | 2.02 | 4.8 | 0.53 |
| example 98 | 0.28 | 0.60 | 1.00 | 1.10 | carbonitride | 64 | 62 | 10 | 10 | 760 | 0.40 | 3.80 | 2.4 | 0.28 |
| example 99 | 0.99 | 0.25 | 0.40 | 1.49 | carbonitride | 64 | 62 | 10 | 10 | 777 | 0.32 | 1.05 | 2.6 | 0.27 |
| example 100 | 1.00 | 0.40 | 0.25 | 1.50 | carbonitride | 64 | 62 | 10 | 10 | 779 | 0.41 | 1.20 | 2.6 | 0.26 |
| comparative example 17 | 1.01 | 0.56 | 1.10 | 1.10 | carburize | 57 | 55 | 10 | 10 | 795 | 0.37 | 2.02 | 3.0 | 1.00 |
| comparative example 18 | 0.99 | 0.35 | 0.40 | 1.49 | carbonitride | 64 | 62 | 10 | 10 | 761 | 0.19 | 0.52 | 1.0 | 0.34 |

TABLE 6-continued

| | contents in steel (mass %) | | | | raceway ring (1) | | | | rolling element (2) | | | | | amount of |
|---|---|---|---|---|---|---|---|---|---|---|---|---|---|---|
| | C | Si | Mn | Cr | heat treatment | surface hardness | core hardness | $\gamma_R$ | $\gamma_R$ | surface hardness | nitrogen concentrate | amount of nitride | life | permanent deformation |
| comparative example 19 | 0.99 | 0.30 | 0.40 | 1.49 | carbonitride | 64 | 62 | 10 | 10 | 754 | 0.20 | 0.87 | 1.2 | 0.32 |

(1) Surface hardness of a raceway surface and core hardness are Rockwell hardness. $\gamma_R$ designates the amount of retained austenite on a surface layer section, and a unit is vol. %.
(2) Surface hardness of a rolling surface is Vickers hardness Hv. $\gamma_R$ designates the amount of retained austenite on a surface layer section, and a unit is vol. %.
A unit of nitrogen concentration is mass %.
A unit of nitride amount (area percentage) is percent.

(Fourth Test)

The life test was conducted in the environment of lubrication contaminated with foreign substances by use of a conical roller bearing assigned bearing number L44649/610. Test conditions are as follows:

Test load: radial load Fr=12 kN, axial load Fa=3.5 kN

Number of revolutions: 3000 $min^{-1}$

Lubricating oil: VG68

Hardness of foreign substance: Hv870

Size of foreign substance: 74 to 134 μm

Amount of contaminated foreign substance: 0.1 g

High-carbon chromium bearing steel (SUJ2) or chromium steel (SCr420) was used for the inner and outer rings, and steel having chemical components corresponding to SUJ3 was used for the rolling element except the amounts of Si+Mn. In relation to heat treatment, materials corresponding to SUJ2 and SUJ3 were quenched in the atmosphere of the RX gas at 830 to 850° C. or subjected to carburizing or carbonitriding at 830 to 850° C. in the atmosphere consisting of the RX gas+the enriched gas+the ammonium gas (the ammonium gas is used for carbonitriding) for 1 hour to 20 hours. The materials were subsequently tempered at 180 to 240° C. After undergoing carburizing or carbonitriding at 850 to 900° C., SCr240 was subjected to secondary quenching at 800 to 850° C. and then to tempering at 150 to 200° C.

Table 7 shows the quality of raceway rings and rolling elements, which were used in the test, and results of the life test. The electron probe micro analyzer (EPMA) was used for measuring the surface nitrogen concentration in the raceway surface and the rolling surface, thereby performing quantitative analysis. The life tests were performed twelve times (n=12) for each of the test bearings, thereby studying a life time lasting until occurrence of stripping, preparing a Weibull plot, and determining life L10 from a result of the Weibull distribution. The thus-determined life is taken as a life value. Life is provided in the form of a value of a ratio on condition that the life of the comparative example 20 having the shortest is taken as 1.

TABLE 7

| | surface nitrogen concentration (mass %) | | material of | area percentage of Si + Mn based nitride of | amount of Si + Mn of rolling | |
|---|---|---|---|---|---|---|
| | raceway ring | rolling element | raceway ring | rolling element | element (mass %) | life ratio |
| example 101 | 0 | 0.6 | SUJ2 | 3.1 | 0.5 | 3 |
| example 102 | 0 | 0.5 | SUJ2 | 2.7 | 0.5 | 3.1 |
| example 103 | 0 | 0.4 | SUJ2 | 2.6 | 0.5 | 2.9 |

TABLE 7-continued

| | surface nitrogen concentration (mass %) | | material of | area percentage of Si + Mn based nitride of | amount of Si + Mn of rolling | |
|---|---|---|---|---|---|---|
| | raceway ring | rolling element | raceway ring | rolling element | element (mass %) | life ratio |
| example 104 | 0 | 0.35 | SUJ2 | 2.4 | 0.5 | 2.8 |
| example 105 | 0 | 0.3 | SUJ2 | 2.3 | 0.5 | 2.2 |
| example 106 | 0 | 0.25 | SUJ2 | 2.1 | 0.5 | 2.2 |
| example 107 | 0 | 0.2 | SUJ2 | 2.0 | 0.5 | 2.1 |
| example 108 | 0 | 0.5 | SUJ2 | 2.9 | 0.7 | 3.1 |
| example 109 | 0 | 0.5 | SUJ2 | 3.2 | 0.9 | 3.2 |
| example 110 | 0 | 0.5 | SUJ2 | 3.8 | 1 | 4.4 |
| example 111 | 0 | 0.5 | SUJ2 | 4.1 | 1.2 | 4.5 |
| example 112 | 0 | 0.5 | SUJ2 | 4.5 | 1.6 | 4.7 |
| example 113 | 0 | 0.5 | SUJ2 | 5.1 | 2 | 4.7 |
| example 114 | 0.01 | 0.5 | SUJ2 | 4.5 | 1.6 | 4.5 |
| example 115 | 0.03 | 0.5 | SUJ2 | 4.5 | 1.6 | 4.4 |
| example 116 | 0.05 | 0.5 | SUJ2 | 4.5 | 1.6 | 4.2 |
| example 117 | 0 | 0.5 | SCr420 | 4.5 | 1.6 | 5.1 |
| example 118 | 0.01 | 0.5 | SCr420 | 4.5 | 1.6 | 4.8 |
| example 119 | 0.03 | 0.5 | SCr420 | 4.5 | 1.6 | 4.6 |
| example 120 | 0.05 | 0.5 | SCr420 | 4.5 | 1.6 | 4.5 |
| comparative example 20 | 0 | 0 | SUJ2 | 0.0 | 0.5 | 1 |
| comparative example 21 | 0 | 0.1 | SUJ2 | 0.9 | 0.5 | 1.2 |
| comparative example 22 | 0 | 0.15 | SUJ2 | 1.6 | 0.5 | 1.2 |

As is clear from Table 7, when the raceway ring made from SUJ2 is compared with the raceway ring made from SCr420, greater effects are yielded in the case of the raceway ring made from SCr420. The conceivable reason for this is that, when SCr420 is used for the raceway ring, the raceway ring is vulnerable to indentation and the rolling element becomes less susceptible to indentation, because the core hardness of SCr420 is softer than the core hardness of SUJ2, whereby the life-extension effect is yielded.

In relation to the tests, there provided examples where the high-carbon chromium bearing steel (SUJ2) or the chromium steel (SCr420) was applied to the raceway ring; steel including 1.0 mass % of raw material carbon was applied to the rolling element; and where the steels were subjected to quenching, tempering, or carburizing or carbonitriding. However, so long as the surface hardness of a completed raceway surface and the surface hardness of a completed rolling surface are greater than HRC55 and fall within the range of the present invention, analogous effects are yielded.

Although the present invention has been described in detail or by reference to specific embodiments, it is manifest to those skilled in the art that the present invention is susceptible to various alterations or modifications without departing the spirit and scope of the present invention.

The present patent application is based on Japanese Patent Application (JP-A-2006-148497) which was filed on May 29, 2006 and which is based on Japanese Patent Application (JP-2006-140111) filed on May 19, 2006; Japanese Patent Application (JP-2006-150375) filed on May 30, 2006; Japanese Patent Application (JP-2007-107250) filed on Apr. 16, 2007; and Japanese Patent Application (JP-2007-112995) filed on Apr. 23, 2007, and their contents are hereby incorporated by reference.

The invention claimed is:

1. A rolling apparatus comprising:

an external member having a raceway surface on an inner peripheral surface thereof;

an internal member having a raceway surface on an outer peripheral surface thereof; and a plurality of rolling elements which are rotatably provided between the raceway surface of the external member and the raceway surface of the internal member, wherein *the rolling elements are made of steel which contains*

*0.95 to 1.10 mass % of C,*

*0.4 to 0.7 mass % of Si,*

*0.9 to 1.15 mass % of Mn,*

*0.9 to 1.20 mass % of Cr,*

*remaining Fe and inevitable impurities, and*

*wherein* a surface of at least one of the internal member, the external member, and the rolling elements is subjected to carbonitriding or nitriding, an area percentage of a nitride containing Si and Mn is 1% or more and [20%] *3.65*% or less, a hardness on a surface is HV750 or more,

*a concentration of nitrogen on a surface layer of at least one of the internal element, the external element, and the rolling elements is 0.2 mass % to 0.64 mass %,* and when depth from the raceway surface or depth from a rolling surface of the rolling element is defined as Z and diameter of the rolling element is defined as d, hardness at Z=0.045d is [HV650] *HV770* to [850] *816*, and hardness at Z=0.18d is [HV400] *HV700* to [800] *771,*

*when an amount of retained austenite on the raceway surfaces is defined as* $\gamma r_{AB}$ *and when an amount of retained austenite on the rolling surface of the rolling element is defined as* $\gamma r_C$, $\gamma r_{AB}-15 \leq \gamma r_C \leq \gamma r_{AB}+15$ *(*$0 \leq \gamma r_{AB}$, $\gamma r_C \leq 50$*, and a unit is vol. %) is satisfied.*

2. The rolling apparatus according to claim 1, wherein

[a concentration of nitrogen on a surface layer of at least one of the internal element, the external element, and the rolling elements is 0.2 mass % or more, and] a number of nitride of which size is 0.05 μm to 1 μm and which contains Si and Mn in an area of 375 $\mu m^2$ is 100 or more.

[3. The rolling apparatus according to claim 2, wherein at least one of the carbonitrided or nitrided internal member, external member, and rolling elements is made of steel which contains 0.3 to 1.2 mass % of C, 0.3 to 2.2 mass % of Si, 0.3 to 2.0 mass % of Mn, 0.5 to 2.0 mass % of Cr, 5 or less of Si/Mn, remaining Fe and inevitable impurities.]

4. The rolling apparatus according to claim [3] *1*, wherein a carbonitrided or nitrided member is the rolling elements.

[5. The rolling apparatus according to claim 4, wherein, when an amount of retained austenite on the raceway surfaces is defined as $\gamma r_{AB}$ and when an amount of retained austenite on the rolling surface of the rolling element is defined as $\gamma r_C$, $\gamma r_{AB}-15 \leq \gamma r_C \leq \gamma r_{AB}+15$ ($0 \leq \gamma r_{AB}$, $\gamma r_C \leq 50$, and a unit is vol. %) is satisfied.]

* * * * *